US011656594B2

(12) United States Patent
Law et al.

(10) Patent No.: US 11,656,594 B2
(45) Date of Patent: May 23, 2023

(54) TECHNOLOGIES FOR CONFIGURING VOTING BLOCKS ASSOCIATED WITH A PROCESS CONTROL SYSTEM

(71) Applicant: FISHER-ROSEMOUNT SYSTEMS, INC., Round Rock, TX (US)

(72) Inventors: Gary K. Law, Georgetown, TX (US); Godfrey R. Sherriff, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 255 days.

(21) Appl. No.: 16/660,439

(22) Filed: Oct. 22, 2019

(65) Prior Publication Data

US 2021/0116878 A1    Apr. 22, 2021

(51) Int. Cl.
| | |
|---|---|
| *G05B 19/04* | (2006.01) |
| *G05B 19/042* | (2006.01) |
| *G05B 9/03* | (2006.01) |

(52) U.S. Cl.
CPC ........... *G05B 19/0425* (2013.01); *G05B 9/03* (2013.01); *G05B 2219/14123* (2013.01)

(58) Field of Classification Search
CPC .............. G05B 19/0425; G05B 9/03; G05B 2219/14123; G05B 19/0428; G05B 2219/24192; G05B 19/4183; G05B 19/4185

See application file for complete search history.

(56) References Cited

U.S. PATENT DOCUMENTS

| | | | |
|---|---|---|---|
| 6,003,105 A | 12/1999 | Vicard et al. | |
| 6,128,691 A | 10/2000 | Haren et al. | |
| 6,448,982 B1 * | 9/2002 | Klapper | G05B 19/4189 |
| | | | 715/764 |

(Continued)

FOREIGN PATENT DOCUMENTS

| | | |
|---|---|---|
| EP | 0263773 A2 | 4/1988 |
| GB | 2403819 A | 1/2005 |

OTHER PUBLICATIONS

"PCI-X 2.0 Overview", pp. 1-40, PCI-SIG 10.sup.th Year Anniversary.

(Continued)

*Primary Examiner* — Rocio Del Mar Perez-Velez
*Assistant Examiner* — Christopher W Carter
(74) *Attorney, Agent, or Firm* — Marshall, Gerstein & Borun LLP

(57) ABSTRACT

Techniques for enabling the configuration of a voting block for use in a process control system of a process plant are described. According to certain aspects, the voting block may have a voting scheme that dictates an output based on a set of inputs, where the voting block may be configured parametrically using various control selections that direct the behavior of the voting scheme. In particular, a bypass degrade selection may be specified for one or more inputs that controls whether a "bypass" input degrades the voting scheme, a status degrade selection may be specified for one or more inputs that controls whether a "bad" input degrades the voting scheme, and a trip enable selection may be specified that controls whether a trip occurs automatically under certain conditions. The control selections enable the voting blocks to be configured to conform with various specifications and other requirements.

20 Claims, 15 Drawing Sheets

(56) References Cited

U.S. PATENT DOCUMENTS

| | | |
|---|---|---|
| 7,016,994 B2 | 3/2006 | Winkler et al. |
| 7,103,703 B1 | 9/2006 | Reeves et al. |
| 2004/0003161 A1 | 1/2004 | Lee et al. |
| 2004/0151175 A1 | 8/2004 | Moll et al. |
| 2004/0199364 A1* | 10/2004 | Law .................. G05B 23/0256 |
| | | 702/189 |
| 2004/0230709 A1 | 11/2004 | Moll |
| 2004/0255013 A1* | 12/2004 | Ott .......................... G05B 9/03 |
| | | 709/223 |

OTHER PUBLICATIONS

Advanced Micro Devices, Inc. "AMD-8131.TM. HyperTransport. TM. PCI-X.RTM. Tunnel Data Sheet", 24637 Rev. 3.02, pp. 1-87, Aug. 10, 2004.

Advanced Micro Devices, Inc., "HyperTransport.TM. Technology I/O Link, A High-Bandwidth I/O Architecture", White Paper, pp. 1-25, Jul. 20, 2001.

Search Report for Application No. GB2015880.4, dated Jul. 5, 2021.

* cited by examiner

| VOTER SCHEME | INPUT 1 | INPUT 2 | INPUT 3 | NUM VOTES | DEGRADED SCHEME | OUTPUT | |
|---|---|---|---|---|---|---|---|
| 2oo3 | NML | NML | TRP | 1 | 2oo3 | NML | BYPASS ALLOWED |
| 411 → | NML | TRP | TRP | 2 | 2oo3 | TRP | BYPASS ALLOWED |
| 412 → | TRP | TRP | TRP | 3 | 2oo3 | TRP | BYPASS ALLOWED |
| 413 → | BYP | NML | NML | 0 | 2oo2 | NML | BYPASS ALLOWED |
| | BYP | TRP | NML | 1 | 2oo2 | NML | BYPASS ALLOWED |
| | BYP | TRP | TRP | 2 | 2oo2 | TRP | BYPASS ALLOWED |
| 414 → | BYP | BYP | NML | 0 | 1oo1 | NML | BYPASS NOT ALLOWED |
| | BYP | BYP | TRP | 1 | 1oo1 | TRP | BYPASS NOT ALLOWED |
| | BYP | BYP | BAD | 0 | 0oo0 | TRP | BYPASS NOT ALLOWED |
| | BAD | NML | NML | 0 | 1oo2 | NML | BYPASS ALLOWED |
| | BAD | TRP | NML | 1 | 1oo2 | TRP | BYPASS ALLOWED |
| | BAD | TRP | TRP | 2 | 1oo2 | TRP | BYPASS ALLOWED |
| | BAD | BAD | NML | 0 | 1oo1 | NML | BYPASS NOT ALLOWED |
| | BAD | BAD | TRP | 1 | 1oo1 | TRP | BYPASS NOT ALLOWED |
| | BAD | BAD | BAD | 0 | 0oo0 | TRP | BYPASS NOT ALLOWED |
| | BYP | BAD | NML | 0 | 1oo1 | NML | BYPASS NOT ALLOWED |
| | BYP | BAD | TRP | 1 | 1oo1 | TRP | BYPASS NOT ALLOWED |
| | BYP | BAD | BAD | 0 | 0oo0 | TRP | BYPASS NOT ALLOWED |

| | | |
|---|---|---|
| BYPASS DEGRAD | N | R — 404 |
| STATUS DEGRAD | Y | N — 408 |
| TRIP INH ENABLE | N | ← 410 |

| VOTER SCHEME 2oo3 | INPUT 1 | INPUT 2 | INPUT 3 | NUM VOTES | DEGRADED SCHEME | OUTPUT | |
|---|---|---|---|---|---|---|---|
| | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| 422 → | BYP | NML | NML | 0 | 2oo2 | NML | BYPASS NOT ALLOWED |
| | BYP | TRP | NML | 1 | 2oo2 | NML | BYPASS NOT ALLOWED |
| | BYP | TRP | TRP | 2 | 2oo2 | TRP | BYPASS NOT ALLOWED |
| | BYP | BYP | NML | 0 | 2oo1 | NML | BYPASS NOT ALLOWED |
| | BYP | BYP | TRP | 1 | 2oo1 | TRP | BYPASS NOT ALLOWED |
| | BYP | BYP | BAD | 0 | 2oo0 | TRP | BYPASS NOT ALLOWED |
| | BAD | NML | NML | 0 | 2oo2 | NML | BYPASS NOT ALLOWED |
| | BAD | TRP | NML | 1 | 2oo2 | NML | BYPASS NOT ALLOWED |
| 423 → | BAD | TRP | TRP | 2 | 2oo2 | TRP | BYPASS NOT ALLOWED |
| | BAD | BAD | NML | 0 | 2oo1 | TRP | BYPASS NOT ALLOWED |
| | BAD | BAD | TRP | 1 | 2oo1 | TRP | BYPASS NOT ALLOWED |
| | BAD | BAD | BAD | 0 | 1oo0 | TRP | BYPASS NOT ALLOWED |
| | BYP | BAD | NML | 0 | 2oo1 | TRP | BYPASS NOT ALLOWED |
| | BYP | BAD | TRP | 1 | 2oo1 | TRP | BYPASS NOT ALLOWED |
| | BYP | BAD | BAD | 0 | 2oo0 | TRP | BYPASS NOT ALLOWED |

| BYPASS DEGRAD | N | N | |
|---|---|---|---|
| STATUS DEGRAD | N | N | |
| TRIP INH ENABLE | N ← 421 | | |

FIG. 4B

| VOTER SCHEME | INPUT 1 | INPUT 2 | INPUT 3 | NUM VOTES | DEGRADED SCHEME | OUTPUT | |
|---|---|---|---|---|---|---|---|
| 2oo3 | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 1oo2 | NML | BYPASS ALLOWED |
| | BYP | TRP | NML | 1 | 1oo2 | TRP | BYPASS ALLOWED |
| | BYP | TRP | TRP | 2 | 1oo2 | TRP | BYPASS ALLOWED |
| | BYP | BYP | NML | 0 | 1oo1 | NML | BYPASS NOT ALLOWED |
| | BYP | BYP | TRP | 1 | 1oo1 | TRP | BYPASS NOT ALLOWED |
| | BYP | BYP | BAD | 0 | 1oo0 | TRP | BYPASS NOT ALLOWED |
| | BAD | NML | NML | 0 | 2oo2 | NML | BYPASS ALLOWED |
| | BAD | TRP | NML | 1 | 2oo2 | NML | BYPASS ALLOWED |
| | BAD | TRP | TRP | 2 | 2oo2 | TRP | BYPASS ALLOWED |
| | BAD | BAD | NML | 0 | 2oo1 | TRP | BYPASS ALLOWED |
| | BAD | BAD | TRP | 1 | 2oo1 | TRP | BYPASS ALLOWED |
| | BAD | BAD | BAD | 0 | 1oo0 | TRP | BYPASS NOT ALLOWED |
| | BYP | BAD | NML | 0 | 1oo1 | NML | BYPASS NOT ALLOWED |
| | BYP | BAD | TRP | 1 | 1oo1 | TRP | BYPASS NOT ALLOWED |
| | BYP | BAD | BAD | 0 | 1oo0 | TRP | BYPASS NOT ALLOWED |

| BYPASS DEGRAD | R |
| STATUS DEGRAD | N |
| TRIP INH ENABLE | N |

FIG. 4C

| VOTER SCHEME 2oo3 | INPUT 1 | INPUT 2 | INPUT 3 | NUM VOTES | DEGRADED SCHEME | OUTPUT | |
|---|---|---|---|---|---|---|---|
| | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 2oo2 | NML | BYPASS ALLOWED |
| | BYP ← 432 | TRP | NML | 1 | 2oo2 | NML | BYPASS ALLOWED |
| | BYP | TRP | TRP | 2 | 2oo2 | TRP | BYPASS ALLOWED |
| | BYP | BYP | NML | 0 | 1oo1 | NML | BYPASS NOT ALLOWED |
| | BYP | BYP | TRP | 1 | 1oo1 | TRP | BYPASS NOT ALLOWED |
| | BYP | BYP | BAD | 0 | 1oo0 | NML | BYPASS NOT ALLOWED |
| | BAD ← 433 | NML | NML | 0 | 2oo2 | NML | BYPASS NOT ALLOWED |
| | BAD | TRP | NML | 1 | 2oo2 | NML | BYPASS NOT ALLOWED |
| | BAD | TRP | TRP | 2 | 2oo2 | TRP | BYPASS NOT ALLOWED |
| | BAD | BAD | NML | 0 | 2oo1 | NML | BYPASS NOT ALLOWED |
| | BAD | BAD | TRP | 1 | 2oo1 | TRP | BYPASS NOT ALLOWED |
| | BAD | BAD | BAD | 0 | 1oo0 | NML | BYPASS NOT ALLOWED |
| | BYP | BAD | NML | 0 | 2oo1 | NML | BYPASS ALLOWED |
| | BYP | BAD | TRP | 1 | 2oo1 | TRP | BYPASS ALLOWED |
| | BYP | BAD | BAD | 0 | 2oo0 | TRP | BYPASS ALLOWED |

| BYPASS DEGRAD | N | R |
| STATUS DEGRAD | N | N |
| TRIP INH ENABLE | N ← 431 | |

FIG. 4D

| VOTER SCHEME | INPUT 1 | INPUT 2 | INPUT 3 | NUM VOTES | DEGRADED SCHEME | OUTPUT | |
|---|---|---|---|---|---|---|---|
| 2oo3 | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 1oo2 | NML | BYPASS NOT ALLOWED |
| | BYP | TRP | NML | 1 | 1oo2 | TRP | BYPASS NOT ALLOWED |
| | BYP | TRP | TRP | 2 | 1oo2 | TRP | BYPASS NOT ALLOWED |
| | BYP | BYP | NML | 0 | 0oo1 | TRP | BYPASS NOT ALLOWED |
| | BYP | BYP | TRP | 1 | 0oo1 | TRP | BYPASS NOT ALLOWED |
| | BYP | BYP | BAD | 0 | 0oo0 | TRP | BYPASS NOT ALLOWED |
| | BAD | NML | NML | 0 | 2oo2 | NML | BYPASS ALLOWED |
| | BAD | TRP | NML | 1 | 2oo2 | NML | BYPASS ALLOWED |
| | BAD | TRP | TRP | 2 | 2oo2 | TRP | BYPASS ALLOWED |
| | BAD | BAD | NML | 0 | 2oo1 | TRP | BYPASS ALLOWED |
| | BAD | BAD | TRP | 1 | 2oo1 | TRP | BYPASS NOT ALLOWED |
| | BAD | BAD | BAD | 0 | 1oo0 | TRP | BYPASS NOT ALLOWED |
| | BYP | BAD | NML | 0 | 1oo1 | NML | BYPASS NOT ALLOWED |
| | BYP | BAD | TRP | 1 | 1oo1 | TRP | BYPASS NOT ALLOWED |
| | BYP | BAD | BAD | 0 | 1oo0 | TRP | BYPASS NOT ALLOWED |

| | | |
|---|---|---|
| BYPASS DEGRAD | R | R |
| STATUS DEGRAD | N | N |
| TRIP INH ENABLE | N | |

FIG. 4E

| VOTER SCHEME | INPUT 1 | INPUT 2 | INPUT 3 | NUM VOTES | DEGRADED SCHEME | OUTPUT | |
|---|---|---|---|---|---|---|---|
| 2oo3 | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 2oo2 | NML | BYPASS NOT ALLOWED |
| | BYP | NML | NML | 1 | 2oo2 | NML | BYPASS NOT ALLOWED |
| | BYP | TRP | TRP | 2 | 2oo2 | TRP | BYPASS NOT ALLOWED |
| | BYP | BYP | NML | 0 | 2oo1 | TRP | BYPASS NOT ALLOWED |
| | BYP | BYP | TRP | 1 | 2oo1 | TRP | BYPASS NOT ALLOWED |
| | BYP | BYP | BAD | 0 | 1oo0 | NML | BYPASS ALLOWED |
| | BAD | NML | NML | 0 | 1oo2 | NML | BYPASS ALLOWED |
| | BAD | TRP | NML | 1 | 1oo2 | TRP | BYPASS ALLOWED |
| | BAD | TRP | TRP | 2 | 1oo2 | TRP | BYPASS NOT ALLOWED |
| | BAD | BAD | NML | 0 | 1oo1 | NML | BYPASS NOT ALLOWED |
| | BAD | BAD | TRP | 1 | 1oo1 | TRP | BYPASS NOT ALLOWED |
| | BAD | BAD | BAD | 0 | 0oo0 | NML | BYPASS NOT ALLOWED |
| | BYP | BAD | NML | 0 | 1oo1 | NML | BYPASS NOT ALLOWED |
| | BYP | BAD | TRP | 1 | 1oo1 | TRP | BYPASS NOT ALLOWED |
| | BYP | BAD | BAD | 0 | 1oo0 | TRP | BYPASS NOT ALLOWED |

| BYPASS DEGRAD | N |
| STATUS DEGRAD | Y |
| TRIP INH ENABLE | N |

FIG. 4F

| VOTER SCHEME | INPUT 1 | INPUT 2 | INPUT 3 | NUM VOTES | DEGRADED SCHEME | OUTPUT | |
|---|---|---|---|---|---|---|---|
| 2oo3 | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 2oo2 | NML | BYPASS NOT ALLOWED |
| | BYP | NML | NML | 1 | 2oo2 | NML | BYPASS NOT ALLOWED |
| | BYP | TRP | TRP | 2 | 2oo2 | TRP | BYPASS NOT ALLOWED |
| | BYP | BYP | NML | 0 | 2oo1 | NML | BYPASS NOT ALLOWED |
| | BYP | BYP | TRP | 1 | 2oo1 | TRP | BYPASS NOT ALLOWED |
| | BYP | BYP | BAD | 0 | 1oo0 | TRP | BYPASS NOT ALLOWED |
| | BAD | NML | NML | 0 | 2oo2 | NML | BYPASS NOT ALLOWED |
| | BAD | TRP | NML | 1 | 2oo2 | NML | BYPASS NOT ALLOWED |
| | BAD | TRP | TRP | 2 | 2oo2 | TRP | BYPASS NOT ALLOWED |
| | BAD | BAD | NML | 0 | 1oo1 | NML | BYPASS NOT ALLOWED |
| | BAD | BAD | TRP | 1 | 1oo1 | TRP | BYPASS NOT ALLOWED |
| | BAD | BAD | BAD | 0 | 0oo0 | TRP | BYPASS NOT ALLOWED |
| | BYP | BAD | NML | 0 | 2oo1 | NML | BYPASS NOT ALLOWED |
| | BYP | BAD | TRP | 1 | 2oo1 | TRP | BYPASS NOT ALLOWED |
| | BYP | BAD | BAD | 0 | 1oo0 | TRP | BYPASS NOT ALLOWED |

| BYPASS DEGRAD | N | N | |
|---|---|---|---|
| STATUS DEGRAD | N | Y | |
| TRIP INH ENABLE | N | | |

FIG. 4G

| VOTER SCHEME 2oo3 | INPUT 1 | INPUT 2 | INPUT 3 | NUM VOTES | DEGRADED SCHEME | OUTPUT | |
|---|---|---|---|---|---|---|---|
| | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 2oo2 | NML | BYPASS NOT ALLOWED |
| | BYP | NML | NML | 1 | 2oo2 | NML | BYPASS NOT ALLOWED |
| | BYP | TRP | TRP | 2 | 2oo2 | TRP | BYPASS NOT ALLOWED |
| | BYP | TRP | NML | 0 | 2oo2 | TRP | BYPASS NOT ALLOWED |
| | BYP | BYP | TRP | 1 | 2oo1 | TRP | BYPASS NOT ALLOWED |
| | BYP | BYP | BAD | 0 | 2oo1 | TRP | BYPASS NOT ALLOWED |
| | BAD | NML | NML | 0 | 1oo2 | NML | BYPASS ALLOWED |
| | BAD | TRP | NML | 1 | 1oo2 | TRP | BYPASS ALLOWED |
| | BAD | TRP | TRP | 2 | 1oo2 | TRP | BYPASS ALLOWED |
| | BAD | BAD | NML | 0 | 0oo1 | TRP | BYPASS ALLOWED |
| | BAD | BAD | TRP | 1 | 0oo1 | TRP | BYPASS ALLOWED |
| | BAD | BAD | BAD | 0 | 0oo0 | TRP | BYPASS NOT ALLOWED |
| | BYP | BAD | NML | 0 | 1oo1 | NML | BYPASS NOT ALLOWED |
| | BYP | BAD | TRP | 1 | 1oo1 | TRP | BYPASS NOT ALLOWED |
| | BYP | BAD | BAD | 0 | 0oo0 | TRP | BYPASS NOT ALLOWED |

| | | |
|---|---|---|
| BYPASS DEGRAD | N | N |
| STATUS DEGRAD | Y | Y |
| TRIP INH ENABLE | N | |

FIG. 4H

| VOTER SCHEME | INPUT 1 | INPUT 2 | INPUT 3 | NUM VOTES | DEGRADED SCHEME | OUTPUT | |
|---|---|---|---|---|---|---|---|
| 2oo3 | NML | NML | TRP | 1 | 2oo3 | NML | BYPASS ALLOWED |
| | NML | TRP | TRP | 2 | 2oo3 | TRP | BYPASS ALLOWED |
| | TRP | TRP | TRP | 3 | 2oo3 | TRP | BYPASS ALLOWED |
| | BYP | NML | NML | 0 | 2oo2 | NML | BYPASS NOT ALLOWED |
| | BYP | NML | NML | 1 | 2oo2 | NML | BYPASS NOT ALLOWED |
| | BYP | TRP | TRP | 2 | 2oo2 | TRP | BYPASS NOT ALLOWED |
| | BYP | BYP | NML | 0 | 2oo1 | INH | BYPASS NOT ALLOWED |
| | BYP | BYP | TRP | 1 | 2oo1 | INH | BYPASS NOT ALLOWED |
| | BYP | BYP | BAD | 0 | 2oo0 | INH | BYPASS NOT ALLOWED |
| | BAD | NML | NML | 0 | 2oo2 | NML | BYPASS NOT ALLOWED |
| | BAD | TRP | NML | 1 | 2oo2 | NML | BYPASS NOT ALLOWED |
| | BAD | TRP | TRP | 2 | 2oo2 | TRP | BYPASS NOT ALLOWED |
| | BAD | BAD | NML | 0 | 2oo1 | INH | BYPASS NOT ALLOWED |
| | BAD | BAD | TRP | 1 | 2oo1 | INH | BYPASS NOT ALLOWED |
| | BAD | BAD | BAD | 0 | 1oo0 | INH | BYPASS NOT ALLOWED |
| | BYP | BAD | NML | 0 | 2oo1 | INH | BYPASS NOT ALLOWED |
| | BYP | BAD | TRP | 1 | 2oo1 | INH | BYPASS NOT ALLOWED |
| | BYP | BAD | BAD | 0 | 2oo0 | INH | BYPASS NOT ALLOWED |

| BYPASS DEGRAD | N | N | | | | | |
| STATUS DEGRAD | N | N | | | | | |
| TRIP INH ENABLE | Y ← 456 | | | | | | |

457 → (row BYP BYP NML)
458 → (row BAD TRP NML)
455 → (table)

FIG. 4I

TECHNOLOGIES FOR CONFIGURING VOTING BLOCKS ASSOCIATED WITH A PROCESS CONTROL SYSTEM

FIELD OF THE TECHNOLOGY

This disclosure relates generally to configuring voting blocks for process control systems and, in particular, to effectively and efficiently enabling the configuration of voting blocks using various control inputs to conform with various specifications.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices and controllers are generally referred to as "process control devices."

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

In many process control systems, a separate safety system is provided to detect significant safety related problems within the process plant and to automatically facilitate preventative measures, such as closing valves, removing power from devices, switching flows within the plant, etc. when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental nature of the event, such as closing valves, turning devices off, removing power from sections of the plant, etc. Generally, these actions include switching safety devices into a tripped or "safe" mode of operation which is designed to prevent a serious or hazardous condition within the process plant.

Function blocks within the safety instrumented system or logic solver may be programmed with logic that bypasses or overrides the use of a signal or detected condition of a field device when, for example, the signal received from the field device is bad, when logic within the field device is in a bad or non-normal mode, or when a manual signal is sent from an operator workstation to initiate such a bypass or override. For example, some analog input (AI) or digital input (DI) function blocks are programmed to provide a bypass or an override to logic within the safety system controller which prevents the safety system controller logic from using the output of the field device (i.e., the output of the AI or the DI block) as a valid input to be used in determining whether an event has occurred. These function blocks, however, typically provide such a bypass or override signal in response to a manual activation signal generated by an operator or engineer when a field device is, for example, undergoing maintenance.

Similarly, it is common practice in safety instrumented systems to use redundant input devices such as transmitters and switches to detect events within the system to provide greater safety integrity or process variable measurement availability. In such systems, it is sometimes necessary to provide voting logic functionality in the shutdown logic to determine whether the process condition is acceptable or dangerous based on the redundant inputs. Such voting logic is fairly straight-forward, in that it typically needs only to determine a majority vote of the inputs to detect if an event condition has occurred. For example, a two-out-of-three (2oo3) voting block may call for a safety system to trip when two out of the three inputs are TRIP. Furthermore, it is possible to provide voting function blocks with override and bypass capabilities to, for example, prevent operation of the shut down system during startup of the process control system, to enable maintenance personnel to perform maintenance operations on one or more of the input devices, to allow selected process conditions to be temporarily ignored, etc.

At present, voting blocks are programmed as necessary and are not configurable. That is, each time a voting block is needed to perform differently from a "standard" behavior as initially defined, the block must be manually re-programmed. This introduces the possibility of human error during the programming process, which could lead to situations that are, at best, sub-optimal and, at worst, dangerous and/or life-threatening. Further, in some cases, a "calc block" is added to a generic voting block to "customize" or modify its programmed voting strategy. In addition to providing opportunities for human error, the use of additional calc blocks also introduces delay and inaccuracies into the safety system, as two blocks are operating at set scan times of finite duration, thereby potentially introducing race conditions and read/write problems.

Accordingly, there is an opportunity to effectively and efficiently enable for the configuration of voting blocks to reduce human error and conform with a variety of specifications, among other benefits.

SUMMARY

Techniques, systems, apparatuses, components, devices, and methods for configuring voting blocks are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products. A process control or safety instrumented system uses function block logic to coordinate the logic within the process control or safety instrumented system with operational states of field devices In an embodiment, a computer-implemented method of enabling configuration of a configurable voting block for a process control system in a process plant is provided. The configurable voting block may have a voting scheme associated with a set of inputs, and the method may include: receiving, via a user interface, a first control selection that directs whether the voting scheme for the configurable voting block is degraded for a first instance of a first type of input of one of the set of inputs; receiving, via the user interface, a second control selection that directs whether the voting scheme for the configurable voting block is degraded for a second instance of the first type of input of another one of the set of inputs; configuring the configurable voting block according to the first control selection and the second control selection; receiving, from a set of devices associated with the process plant, the set of inputs; and processing the set of inputs according to the configurable voting block that was configured, wherein the processing results in an output of the configurable voting block.

In another embodiment, a computing device for enabling configuration of a configurable voting block for a process control system in a process plant is provided. The configurable voting block may have a voting scheme associated with a set of inputs, and the computing device may include: a user interface, a memory storing a set of computer-executable instructions, and a processor interfacing with the user interface and the memory, and configured to execute the set of computer-executable instructions to cause the processor to: receive, via the user interface, a first control selection that directs whether the voting scheme for the configurable voting block is degraded for a first instance of a first type of input of one of the set of inputs, receive, via the user interface, a second control selection that directs whether the voting scheme for the configurable voting block is degraded for a second instance of the first type of input of another one of the set of inputs, configure the configurable voting block according to the first control selection and the second control selection, receive, from a set of devices associated with the process plant, the set of inputs, and process the set of inputs according to the configurable voting block that was configured, wherein the processing results in an output of the configurable voting block.

In a further embodiment, a controller module for use in a process plant having a processor communicatively coupled to control one or more field devices is provided. The controller module may include: a non-transitory computer readable medium; and a function block stored on the non-transitory computer readable medium and executed on the processor, the function block comprising: a set of inputs, each configured to receive an input signal from within the process plant indicating a process condition, a first control block comprising a first control parameter that directs whether a voting scheme for the function block is degraded for a first instance of a first type of input of one of the set of inputs, a second control block comprising a second control parameter that directs whether the voting scheme for the function block is degraded for a second instance of the first type of input of another one of the set of inputs, an output providing an output signal, and a voter logic block coupled between the first control block, the second control block, and the output, the voter logic block configured to produce the output signal based on the set of input signals, the first control parameter, and the second control parameter.

BRIEF DESCRIPTION OF THE DRAWINGS

FIGS. 4A-4I depict example truth tables depicting inputs and outputs for various configurable voting blocks having different control selections, according to certain embodiments.

DETAILED DESCRIPTION

Figure 1:
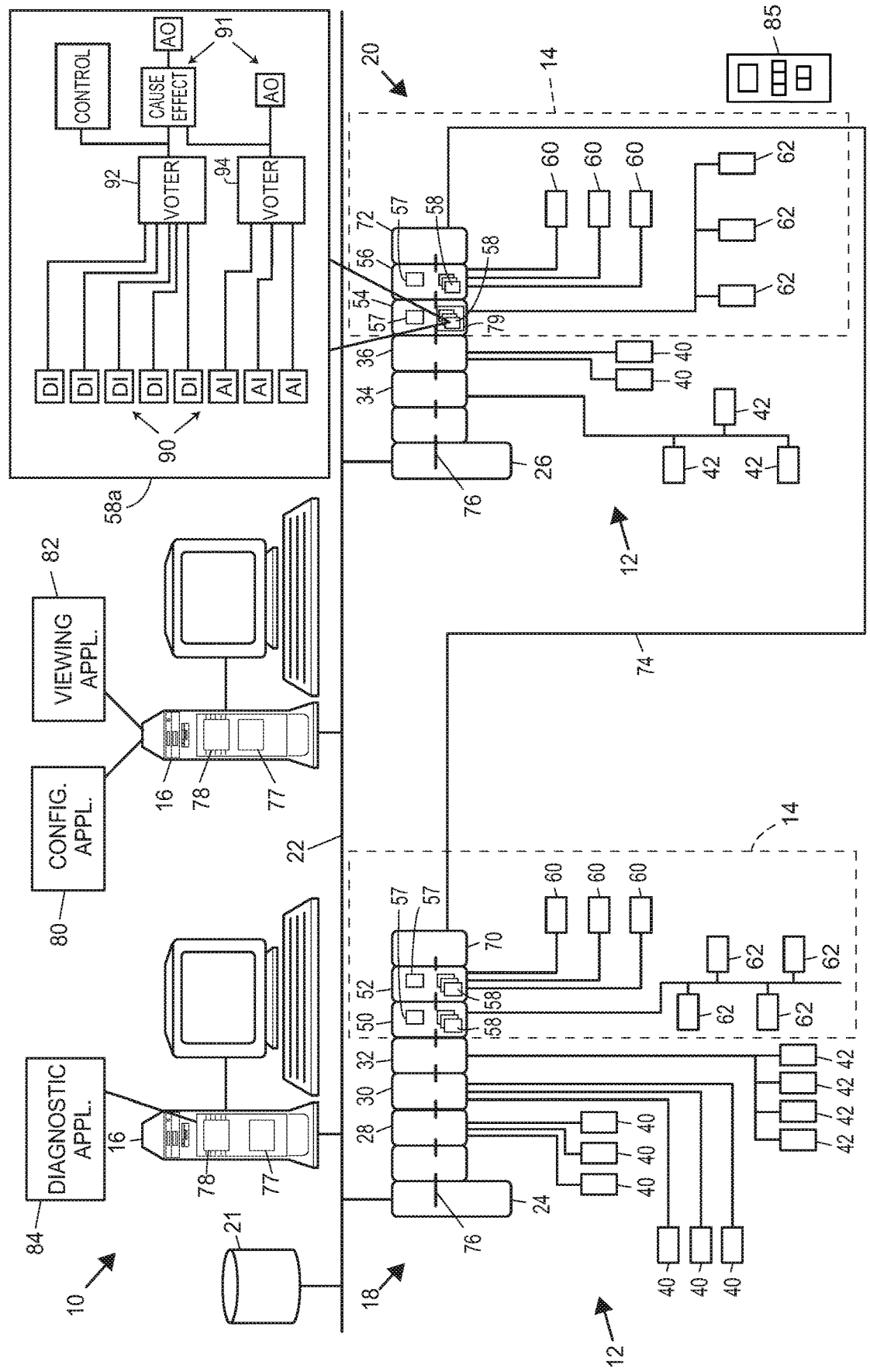
FIG. 1 is a block diagram of an exemplary process plant having a safety system that is integrated with a process control system, according to certain embodiments.

Process control systems for process plants often incorporate one or more safety instrumented systems that monitor the condition of values and parameters within certain operational limits. When risk conditions occur, the safety systems may trigger alarms and/or place one or more portions of process plants in a safe condition or a shutdown condition. Such safety systems are designed to avoid accidents (e.g., fires, explosions, equipment damage, etc.) inside and outside the process plants.

According to the systems and methods as discussed herein, the safety systems incorporate configurable voting function blocks that may be integrated into a programming environment to implement voting logic that may be specified by a user. In embodiments, each configurable voting block may receive multiple inputs from sensors or other field devices and produce a specified output when a pre-set number of the inputs indicate that the output is desired. For example, in a 2-out-of-3 ("2oo3") voting block, at least two of the three inputs would have to indicate a "trip" condition in order for the voting block to output a "trip" signal, otherwise the voting block would output "normal".

Generally, a voting block may operate without concern when the only inputs to the voting block are NML (normal) or TRP (trip). However, there are additional types of inputs associated with a process plant. For example, an input may be BAD (bad) such as if the corresponding field device is inoperable or unreliable (or no signal is received), or BYP (bypass) such as during maintenance of the field device or when a "trip" signal is known to be faulty. A voting block may implement different logic to account for BAD and BYP inputs. In one implementation, a 2oo3 voting block may produce a "trip" output when the inputs are BAD-NML-TRP (i.e., such that the BAD input is treated as a TRP input). In another implementation, a 2oo3 voting block may produce a "normal" output when the inputs are BAD-NML-TRP (i.e., such that the BAD input is treated as a NML input). Similarly, various implementations may treat a BYP input as a TRP input or a NML input.

There are a number of different voting block configurations that may be desired, such as if different customers require different types of voting strategies, sometimes for different portions of the process plants, where the strategies may differ based on various factors such as safety philosophies, cost, performance time, type of control function, and/or other factors. Conventionally, voting blocks are programmed as necessary and are not configurable. As a result, each time a voting block is needed to perform differently from a "standard" behavior as initially defined, the block must be manually re-programmed. This introduces the possibility of human error during the programming process, which could lead to situations that are, at best, sub-optimal and, at worst, dangerous and/or life-threatening. Further, in some cases, a "calc block" may be added to a generic voting block to "customize" or modify its programmed voting strategy. In addition to providing opportunities for human error, the use of additional calc blocks also introduces delay and inaccuracies into the safety system, as two blocks are operating at set scan times of finite duration, thereby potentially introducing race conditions and read/write problems.

The systems and methods as described herein solve these problems by enabling an individual (e.g., a configuration engineer) to configure the behavior of a single voting block parametrically, rather than requiring the programming of a new block and/or the addition of a calc block. The systems and methods may incorporate a user interface with drop-down boxes that may enable the individual to set the behavior of each input or combinations of inputs. According to embodiments, the configurable voting blocks may treat a first input (a first instance of a BAD or BYP input) different than a second or subsequent input of the same type (e.g., asymmetric input treatment), as contrasted to conventional blocks in which each input is subject to the same logic evaluation programmed into the block. For example, a configurable voting block may treat a first instance of a BAD input as NML and a second instance of a BAD input as TRP, or may treat a first instance of a BAD input as NML, but if two BAD inputs occur, then treat both BAD inputs as TRP.

FIG. 1 depicts a process plant 10 that includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, laptops, desktops, mobile devices, workstations, PDAs, etc.) which are accessible by plant personnel, such as process control operators, maintenance personnel, safety engineers, etc. In the example illustrated in FIG. 1, two user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hard-wired or wireless communication structure and using any desired or suitable communication protocol, such as an Ethernet protocol.

According to embodiments, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28-36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50-56 is an I/O device having a processor 57 that executes safety logic modules 58 stored in a memory 79 and is communicatively connected to provide control signals to and/or receive signals from safety system field devices 60 and 62. Additionally, each of the nodes 18 and 20 includes at least one message propagation device (MPD) 70 or 72, which are communicatively coupled to each other via a ring type bus connection 74 (only part of which is illustrated in FIG. 1). The safety system logic solvers 50-56, the safety system field devices 60 and 62, the MPDs 70 and 72 and the bus 74 generally make up the safety system 14 of FIG. 1. It should be appreciated that the safety system 14 as described herein is an example, and that additional or alternative safety systems are envisioned.

The process controllers 24 and 26, which may be, by way of example only, DeltaV™ controllers sold by Emerson Process Management, or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART® or the 4-20 ma protocol (as illustrated for the field devices 40), any fieldbus protocol such as the FOUNDATION® Fieldbus protocol (as illustrated for the field devices 42), or the CAN, Profibus, the AS-Interface protocols, to name but a few. Similarly, the I/O devices 28-36 may be any known types of process control I/O devices using any appropriate communication protocol(s).

The safety logic solvers 50-56 of FIG. 1 may be any desired type of safety system control devices that include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART® or the 4-20 ma protocol, while the safety field devices 62 are illustrated as using a bus communication protocol, such as a FOUNDATION® Fieldbus protocol. The safety field devices 60 may perform any desired function, such as that of a shut-down valve, a shut-off switch, etc.

A common backplane 76 (indicated by a dashed line through the controllers 24, 26, the I/O devices 28-36, the safety logic solvers 50-56 and the MPDs 70 and 72) is used in each of the nodes 18 and 20 to connect the controllers 24 and 26 to the process control I/O cards 28, 30 and 32 or 34 and 36, as well as to the safety logic solvers 50, 52, 54 or 56 and to the MPDs 70 or 72. The controllers 24 and 26 are also communicatively coupled to, and operate as a bus arbitrator for the bus 22, to enable each of the I/O devices 28-36, the logic solvers 50-56 and the MPDs 70 and 72 to communicate with any of the workstations 16 via the bus 22.

According to embodiments, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 16 while a diagnostic application 84 is illustrated as being stored in the other one of the workstations 16. However, if desired, these and other applications could be stored and executed in different ones of the workstations 16 or in other computers associated with the process plant 10. Generally speaking, the configuration application 80 provides configuration information to a safety engineer and enables the safety engineer to configure some or all elements of the process plant 10 and to store that configuration in the configuration database 21. As part of the configuration activities performed by the configuration application 80, the safety engineer may create control routines or control modules for the process controllers 24 and 26, may create safety logic modules 58 for any and all of the safety logic solvers 50-56 (including creating and programming voter function blocks for use in the safety logic solvers 50-56 or even in the controllers 24 and 26) and may download these different control and safety modules to the appropriate ones of the process controllers 24 and 26 and the safety logic solvers 50-56 via the bus 22 and controllers 24 and 26. Similarly, the configuration application 80 may be used to create and download other programs and logic to the I/O devices 28-36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. According to embodiments, the viewing application 82 may receive and display alarms from both the process control system 12 and the safety system 14 in an integrated alarm display as the alarms from both systems 12 and 14 will be sent to the operator work station 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems may use the same types and kinds of parameters, security and referencing so that any data from one of the systems 12 and 14 can be integrated into a display or view traditionally provided for a process control system.

The diagnostic application 84 may be used to implement diagnostics or maintenance programs within the process control and safety system of the plant 10. Such diagnostic applications, which may perform any desired types of diagnostics or maintenance procedures, such as running process and valve tests, startup procedures, etc., may provide overrides to one or more voter function blocks (described below) used within the process plant 10 to prevent operation of the safety system based on inputs from one or more devices effected by the diagnostic procedures.

In any event, the applications 80, 82 and 84, as well as any other applications may send separate configuration and other signals to and may receive data from each of the process controllers 24 and 26 as well as from each of the safety system logic solvers 50-56. These signals may include process-level messages related to controlling the operational parameters of the process field devices 40 and 42, and may include safety-level messages related to controlling the operational parameters of the safety-related field devices 60 and 62. While the safety logic solvers 50-56 may be programmed to recognize both the process-level messages and the safety-level messages, the safety logic solvers 50-56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50-56 may employ the same or a different hardware or software design as compared to the hardware and software design used for the process control I/O cards 28-36. The use of alternate technologies for the devices within the process control system 12 and devices within the safety system 14 may minimize or eliminate common cause hardware or software failures. Furthermore, the safety system devices, including the logic solvers 50-56 may employ any desired isolation and security techniques to reduce or eliminate the chances of unauthorized changes being made to the safety-related functions implemented thereby. For example, the safety logic solvers 50-56 and the configuration application 80 may require a person with a particular authority level or a person located at a particular work station to make changes to the safety modules within the logic solvers 50-56, with this authority level or location being different from the authority or access level or location needed to make changes to the process control functions performed by the controllers 24 and 26 and the I/O devices 28-36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50-56 assess the incoming messages for proper form and security and operate as gatekeepers on changes being made to the safety-level control modules 58 executed within the safety logic solvers 50-56.

According to embodiments, the use of the backplane 76 in each of the nodes 18 and 20 enables the safety logic solvers logic solvers 50 and 52 and the safety logic solvers 54 and 56 to communicate locally with one another to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or nodes of the plant 10. In other words, the use of the MPDs 70 and 72 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

According to embodiments, the logic solvers 50-56 may be programmed to perform control activities with respect to the safety devices 60 and 62, using a function block programming paradigm. In particular, as illustrated in an expanded view of one of the safety control modules 58a (stored in the memory 79) of the logic solver 54, a safety control module may include a set of communicatively interconnected function blocks that can be created and downloaded to the logic solver 54 for implementation during operation of the process 10. As illustrated in FIG. 1, the control module 58a includes two voter function blocks 92 and 94 having inputs communicatively interconnected with other function blocks 90, which may be, for example, analog input (AI), digital input (DI) function blocks, or other function blocks designed to provide signals to the voter function blocks 92. The voter function blocks 92 and 94 have at least one output connected to one or more other function blocks 91 which may be analog output (AO), digital output (DO), cause and effect function blocks which implement cause and effect logic, control and diagnostic function blocks which may receive output signals from the voter function blocks 92 and 94 to control the operation of the safety devices 60 and 62, etc. Of course, the safety control module 58a may be programmed in any desired manner to include any types of function blocks along with one or more voter function blocks configured in any desired or useful manner to perform any desired functionality.

While the expanded view of the safety control module 58a of FIG. 1 includes a digital voter function block 92 having five digital inputs and an analog voter function block 94 having three analog inputs, it will be understood that any number of different safety logic modules 58 can be created for and used within each of the different logic solvers 50-56 and each of these modules can include any number of voter function blocks having any desired number of inputs communicatively connected to other function blocks in any desired manner. Likewise, if used in, for example, a Fieldbus network, the voter function blocks 92 and 94, which may be any fieldbus type function blocks, or any of the other function blocks connected thereto could be located and implemented in other devices, such as in the field devices 62. If used outside of a safety system, the voter function blocks 92 and 94 could be implemented in the process controllers 24, 26, the I/O devices 28-36, the field devices 42, etc. As will be generally understood, the voter function blocks 92 and 94 receive typically redundant inputs provided by redundant sensors or transmitters within the safety system 14 and apply a voting scheme to those inputs to determine if, based on all of those inputs, a safety system trip condition exists.

Figure 2:
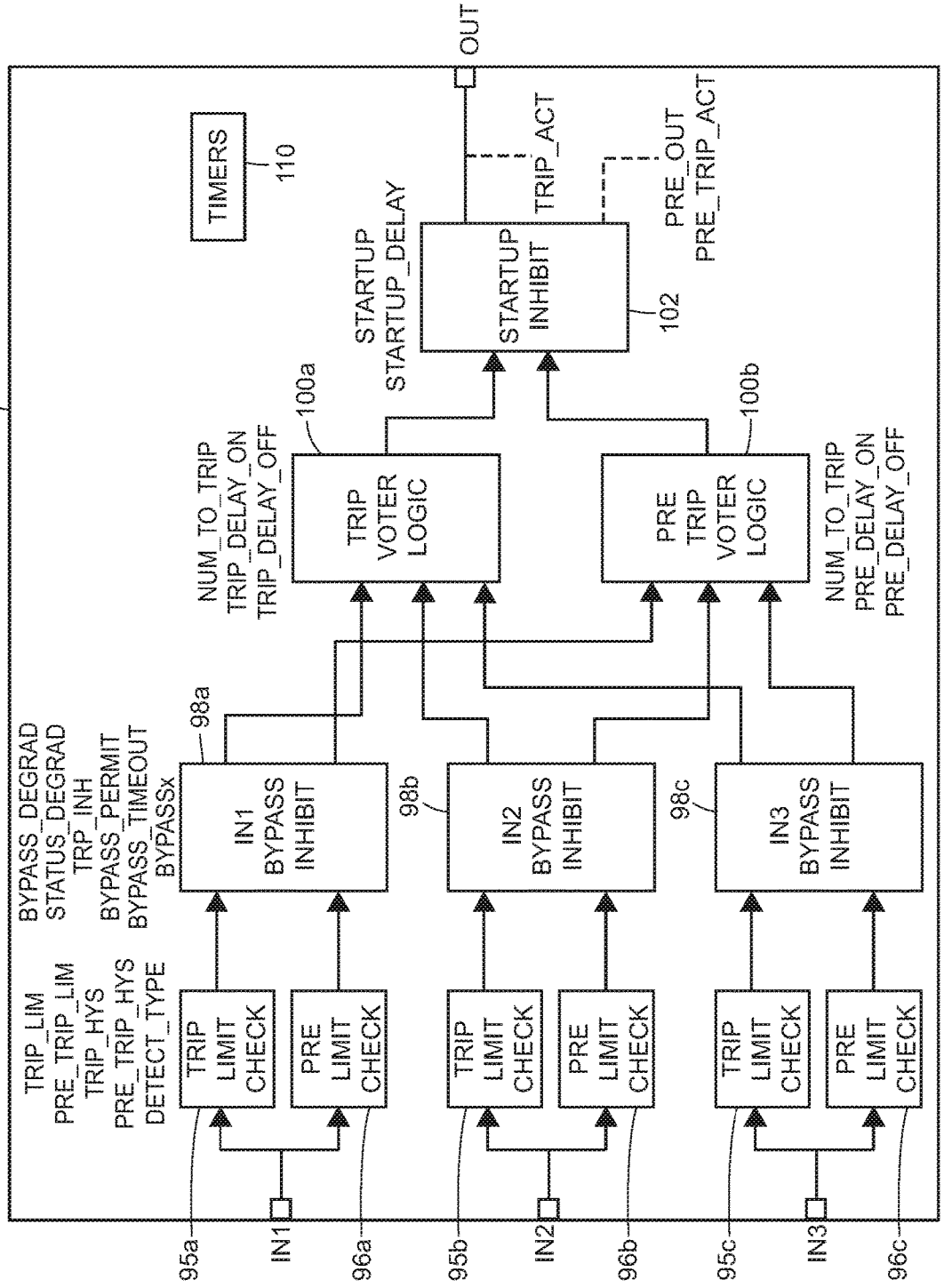
FIG. 2 is block diagram of one of the configurable voter function blocks of FIG. 1, according to certain embodiments.

FIG. 2 is a block diagram illustrating the components of the example voter function block 94 of FIG. 1 which is an analog voter function block in that it processes analog input signals delivered via, for example, analog input (AI) function blocks 90. In general, the voter function block 94 includes three inputs labeled IN1, IN2 and IN3 which are adapted to receive input signals from, for example, redundant sensors or other redundant elements within the process plant 10 such as from the field devices 60 and 62 of FIG. 1. Each of the inputs IN1, IN2, and IN3 may be provided to one of a trip limit check block 95a, 95b, or 95c and to a pre-limit check block 96a, 96b, or 96c. The trip limit check blocks 95 compare the input delivered thereto to a preset limit to determine if the input signal has reached a value (which may be a high value, a low value or a value within a predetermined range) associated with a trip condition. In a similar manner, the pre-limit check blocks 96 compare the input delivered thereto to a preset pre-limit to determine if the input signal has reached a value (which may be a high value, a low value or a value within a predetermined range) associated with an alarm or a warning that indicates that a trip condition, while not yet existing, is close to existing. In effect, the pre-limit check blocks 96 enable an alarm or event signal to be created that indicates that a hazardous or otherwise undesirable condition is close to existing, even though it does not yet exist.

The outputs of the trip limit check blocks 95 and the pre-limit check blocks 96 (which may be, for example, digital signals that are set to a high value when the limits or the pre-limits are met in the blocks 95 and 96) are each delivered to one of a set of input bypass inhibit blocks 98a, 98b, and 98c. The input bypass inhibit blocks 98 perform input inhibits on the individual inputs IN1, IN2, and IN3 so that one or more of these inputs may be inhibited, that is, not used within the voter function block 94 to determine if a trip condition exists or if a pre-trip alarm condition exists. Each of the input bypass inhibit blocks 98 provides an output for the associated trip limit condition to a trip voter logic block 100a and provides an output for the associated pre-limit condition to a pre-trip voter logic block 100b. The voter logic blocks 100a and 100b perform voter logic as described in more detail below to determine if, based on the inputs thereto, a trip condition or a pre-trip alarm condition exists.

The trip voter logic block 100a and the pre-trip voter logic block 100b provide a trip signal and a pre-trip alarm signal (when these conditions are determined to exist), respectively, to a startup inhibit block 102 which may inhibit the voter function block 94 from providing any trip signal or pre-trip alarm signal output during, for example, a startup or other performance or run-time procedure in which it is desirable to inhibit the operation of the voter function block 94. The startup inhibit block 102 develops a trip output signal (labeled Out) determined as a result of the operation of the trip voter logic block 100a and the startup inhibit block logic and additionally develops a Pre_out signal determined as a result of the operation of the pre-trip voter logic block 100 b and the startup inhibit block logic. The Out signal may be used to drive the operation of a shutdown procedure within the safety system 14 of FIG. 1, while the Pre_out signal may be used to provide alarming to indicate the fact that a trip condition is close to existing within the process plant 10. Of course, the Out and the Pre_out signals may be used for other purposes if so desired.

The voter function block 94 may include a set of parameters, some of which are indicated in FIG. 2 above or below the blocks in which they are used, which are set during, for example, configuration of the voter function block 94 to effect or specify the operation of the voter function block 94. In particular, a trip limit (Trip_Lim) and a pre-trip limit (Pre_Trip_Lim) parameter are used to set or establish the trip limits used in the trip limit blocks 95 and to set the pre-trip limits used in the pre-limit check blocks 96. The trip limit and/or the pre-trip limit parameters may be the same for each of the different blocks 95 and 96 or may be set individually for each of the block 95 and 96. Similarly, a trip hysteresis (Trip_Hys) and a pre-trip hysteresis (Pre_Trip_Hys) parameter are used to set the hysteresis that the blocks 95 and 96 must travel through between successive trips. That is, once one of the blocks 95 or 96 detects one of the input signals being above (or below) a limit, the hysteresis value of the type hysteresis parameter (for the blocks 95) and the hysteresis value of the pre-trip hysteresis parameter (for the blocks 96) determine how far below (or above) the limit the input signal must travel before the trip signal (or pre-trip signal) is turned off or before enabling a second trip signal (or pre-trip signal) to be set by that block.

The voter function block 94 also has an internal trip type configuration parameter named Trip_Type which defines the normal and tripped state values associated with the inputs and/or outputs of the voter function block 94. For example, when the voter function block 94 is configured as 'De-energized to Trip' (which may be the default value), the normal operating value of the output is one and the tripped state value is zero. Conversely, when the voter function block 94 is configured as 'Energized to Trip,' the normal operating value is zero and tripped state value is one. This initial determination is made at the trip limit check blocks 95a, 95b, and 95c and at the pre-limit check blocks 96a, 96b, and 96c, which correspond to the inputs IN1, IN2, and IN3, respectively. A detect type (Detect_Type) parameter may be used to determine whether the comparison to the trip limit is to be a greater than (high limit) comparison or to be a less than (low limit) comparison. This comparison occurs at the appropriate trip limit check blocks 95 and the pre-limit check blocks 96 to determine if the input signals have reached the predetermined limits.

As will be understood, the outputs of the trip limit check blocks 95 will each indicate whether a trip is indicated by a corresponding one of the inputs IN1, IN2 and/or IN3. As discussed above, a maintenance override or bypass can be applied by the input bypass inhibit blocks 98 for each of the individual inputs IN1, N2 and IN3 to prevent those inputs from being used in the voting logic applied by the voter logic blocks 100. This bypass feature is desirable when, for example, maintenance is being performed on a transmitter or other field device providing the input signal to the voter function block 94. When using voting logic that determines a trip output based on multiple inputs, maintenance bypasses are not always a necessity because a single false vote to trip (that may result due to maintenance activities on the sensor providing the input) will not necessarily result in a trip. However, this bypass functionality is desirable to prevent false trips during maintenance activities and may be needed in some voter logic, such as in a one out of two voter logic scheme in which the existence of even a single trip signal from redundant sensors will result in a trip.

When one of the input bypass inhibit blocks 98 causes an input to be bypassed, the bypassed input will not be used by the voter logic blocks 100a and 100b to develop a trip signal or a pre-trip alarm signal, even if the input value exceeds the limits specified by the trip limit or the pre-trip limit parameters. To enable bypassing, a bypass permit (Bypass_Permit) parameter can first be enabled to control whether bypassing of the inputs is to be allowed in the first place. Generally speaking, bypassing on inputs will be allowed if the Bypass_Permit parameter is set or enabled while input bypassing will not be allowed if the Bypass_Permit parameter is unset or not enabled. While a single Bypass_Permit parameter may be applicable for all of the bypass inhibit blocks 98, a separate bypass permit may be set for each of input bypass inhibit blocks 98a, 98b, 98c.

If the Bypass_Permit parameter is set or enabled, then a BYPASSx parameter may be used to cause one or more of the bypass inhibit blocks 98 to operate to inhibit the use of an associated one of the inputs IN1, IN2 or IN3. The x in the BYPASSx parameter indicates which one of the inputs IN1, IN2 or IN3 is to be disabled. If desired, more than one input may be inhibited at any particular time or the voter function block 94 may be configured to allow only one input to be inhibited at a time. The Bypass_Permit and the BYPASSx parameters may be set or issued in any desired manner, such as by an operator display button on an operator or maintenance screen, a physical keyswitch, a discrete input into the safety module, by a configuration, control, display or diagnostic application or in any other manner. Of course, if the use of a bypass permit is not needed in any particular implementation of the voter function block 94, the default value of the Bypass_Permit parameter can be set to be enabled at configuration of the voter function block 94.

A bypass timeout (Bypass_Timeout) parameter may be used to set the amount of time after which a bypass for one of the blocks 98 is set that the bypass will automatically expire. In this case, each of the input bypass inhibit blocks 98 may include as one of a set of timers 110 a bypass timer that is set to the Bypass_Timeout parameter value and that may be counted down at the start of the bypass. In this case, the input bypass inhibit blocks 98 may inhibit the use of the associated input until the BYPASSx is turned off or until the bypass timer reaches zero. As will be understood, bypass timers are used to assure that bypasses are removed after a predetermined amount of time.

A bypass degrade (Bypass_Degrad) parameter may be used to direct whether a bypass input for one of the blocks 98 degrades the voting scheme. For example, a 2oo3 voting scheme that is degraded becomes a 1oo3 voting scheme. Each of the blocks 98*a*, 98*b*, 98*c* may have a bypass degrade parameter such that each block 98 may direct whether the respective bypass input degrades the voting scheme.

Similarly, a status degrade (Status_Degrad) parameter may be used to direct whether a bad input for one of the blocks 98 degrades the voting scheme. For example, a 2oo3 voting scheme that is degraded becomes a 1oo3 voting scheme. Each of the blocks 98*a*, 98*b*, 98*c* may have a status degrade parameter such that each block 98 may direct whether the respective bad input degrades the voting scheme.

A trip inhibit enable selection (Trip_INH) may be used to direct whether a trip occurs automatically when the number of required votes exceeds the number of votes that are not bypassed or bad. For example, in a given voting scheme AooB, a trip would occur automatically when the number of required votes (A) exceeds the number of votes that are not bypassed or bad (B) (i.e., A>B). The Bypass_Degrad, Status_Degrad, and Trip_INH parameters are described in further detail with respect to FIGS. 4A-4I.

If desired, the input bypass inhibit blocks 98 may also be configured to provide a reminder alarm to a user, such as an operator, safety engineer, technician, etc. to remind or notify the user that a bypass timeout is imminent. If bypasses are configured to disappear or be unenabled upon a bypass timeout, notification can be sent to a user or other operator in advance of the timeout by setting a reminder time (REMINDER_TIME) parameter to some non-zero value. In this case, if the bypass timer is non-zero but is less than the reminder time parameter and any bypassed input is voting to trip, the reminder alarm can be activated to provide an alarm to the user to indicate that a shut down may occur upon expiration of the bypass timer, which is imminent. If there are no bypassed inputs voting to trip, the alarm does not need to be activated, although it may still be activated. It will be understood, however, that even when the bypass timeout alarm is active, a trip is not necessarily imminent because there may not be enough other inputs voting to trip to cause the trip voter logic block 100*a* to produce a trip signal.

In one embodiment, the bypass timer is re-armed only when the first bypass is timed-out. However, the bypass timer may be a write-able parameter so that, after notification that a timeout is about to occur, the bypass timer can be incremented using an operator display button (or some other suitable technique) to extend the bypass time. Such a feature enables a user to extend the bypass time when, for example, a maintenance procedure is still being performed on the field device providing the bypassed input to the voter function block 94. Alternatively, the notification of bypass timeout may be for indication purposes only when, for example, a bypass is not to be unenabled when the bypass timer times out. In this case the reminder alarm may be set to be active when the bypass timer times out, even if the reminder time parameter is set to zero. However, if the reminder time parameter is non-zero, the reminder will still occur prior to timeout (if the input is voting to trip). The reminder alarms and bypass alarms may be acknowledged or non-acknowledged alarms.

The voting logic performed by the voter logic blocks 100*a* and 100*b* is preferably configured as an "M out of N" logic function. According to this functionality, M inputs must vote to trip out of the total of N inputs. For example, the voter function block 94 can be configured as a two out of three (2oo3) voter, which means that two of the three inputs must meet the trip limit before the voter logic block 100*a* output is set to the trip state value and two out of three of the inputs must meet the pre-trip limit before the pre-trip voter logic block 100*b* is set to a pre-trip alarm value. The N value in the "M out of N" function is determined from the number uninhibited inputs while the M value is determined based on an internal parameter of the block called number to trip (NUM_TO_TRIP), whose default value may be set to any desired value equal to or less than N at configuration. Common voting schemes may include, for example, two out of three, (2oo3), one out of two (1oo2), two out of two (2oo2), etc. However, any other voting logic may be used. Because of the other features of the block 94, the voter function block 94 may also be used for single transmitter applications such as in a one out of one (1oo1) voter function logic situation.

Generally, 1oo2 or 1oo1 voting schemes may need a maintenance bypass function because disabling even one of the transmitters in a manner that causes a detected trip condition at the input of the voter function block 94 for that transmitter during maintenance activities will necessarily result in a trip condition being set by the voter logic block 100*a*. However, voter function blocks configured to require multiple votes to trip can still benefit from a bypass function for more predictable behavior during maintenance procedures.

Bypassing one of the inputs IN1, IN2, or IN3 may affect the voter logic blocks 100*a* and 100*b* in one of two manners. It may either cause the number of inputs needed to determine a trip condition (or a pre-trip alarm condition) to be reduced by one or it may cause this number of inputs to remain the same. For example, when the voter logic block 100*a* is configured as a 2oo3 voter logic block and one of the inputs IN1, IN2, or IN3 is bypassed, the voting scheme may then become a 1oo2 voting scheme, meaning that the number of inputs needed to vote to trip is reduced by one (along with the number of possible inputs). Optionally, the 2oo3 voting scheme may be changed to a 2oo2 voting scheme when a selected input is bypassed, meaning that the number of inputs needed to vote to trip stays the same (even though the number of possible inputs is reduced by one). A bypass options parameter may be used to specify whether the actual number required to trip is to be reduced by one or not when an input is bypassed.

Figure 3A:
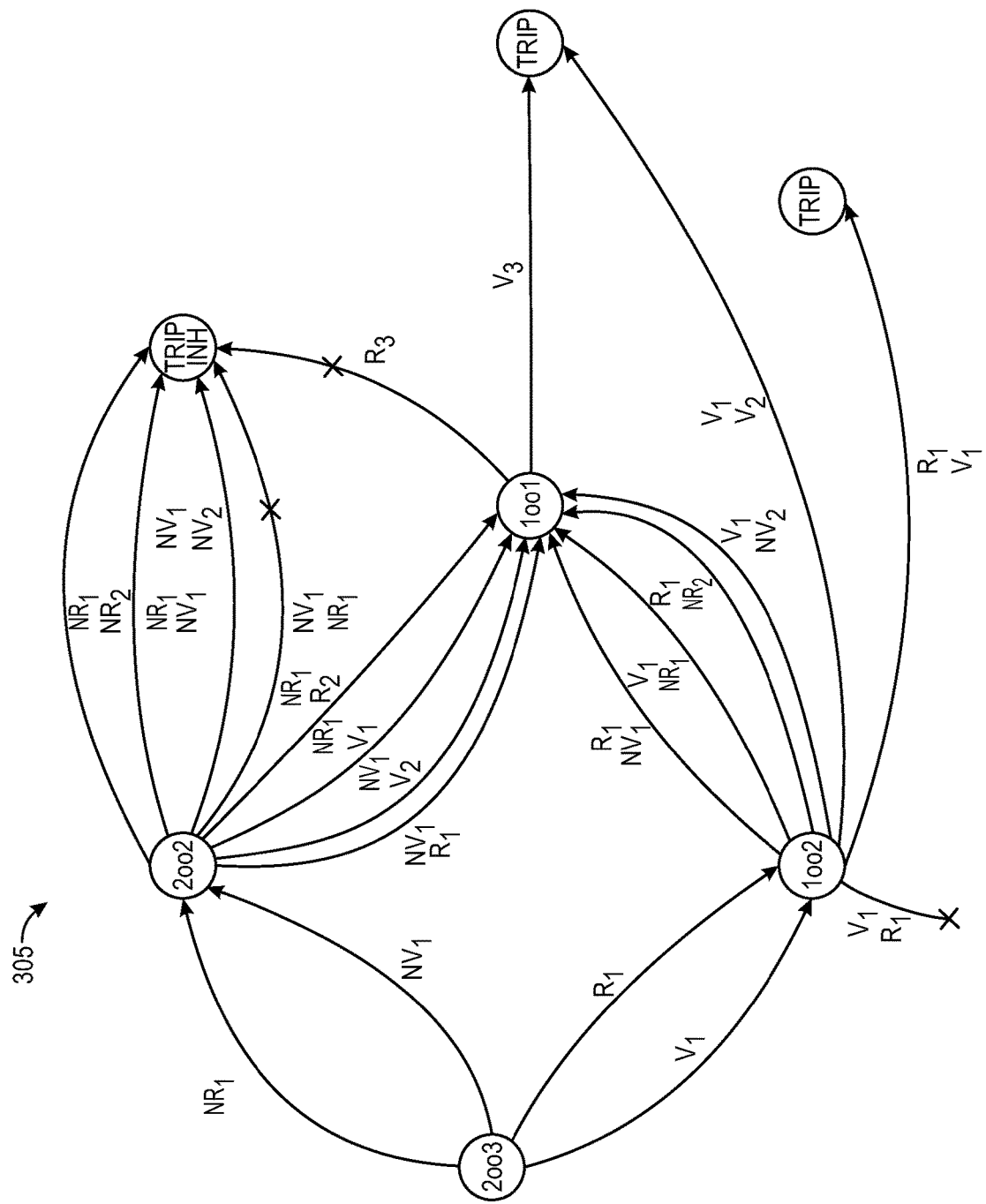
FIGS. 3A-3C depict example state diagrams for various voting schemes with a degradation option, according to certain embodiments.
Figure 3B:
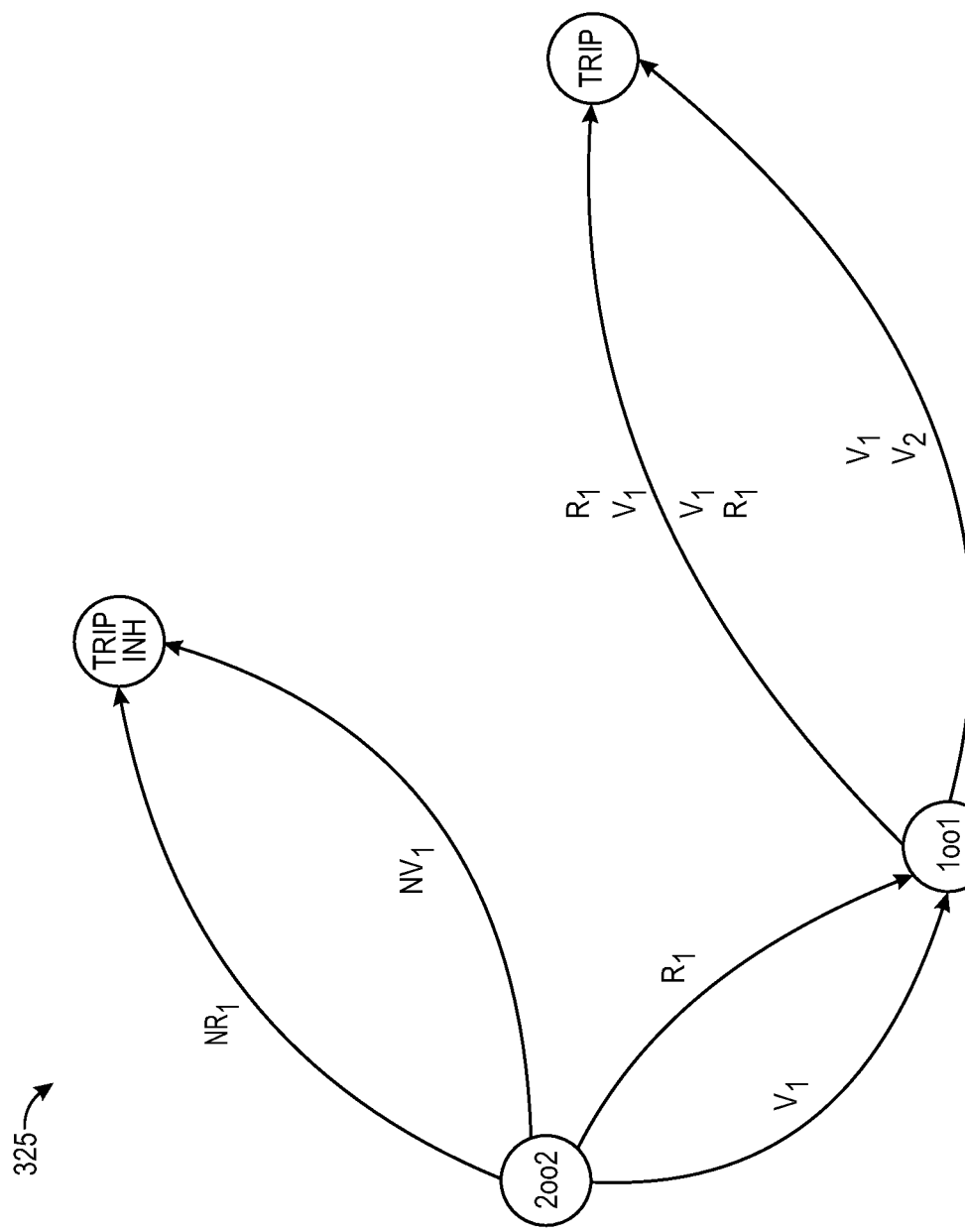
Figure 3C:
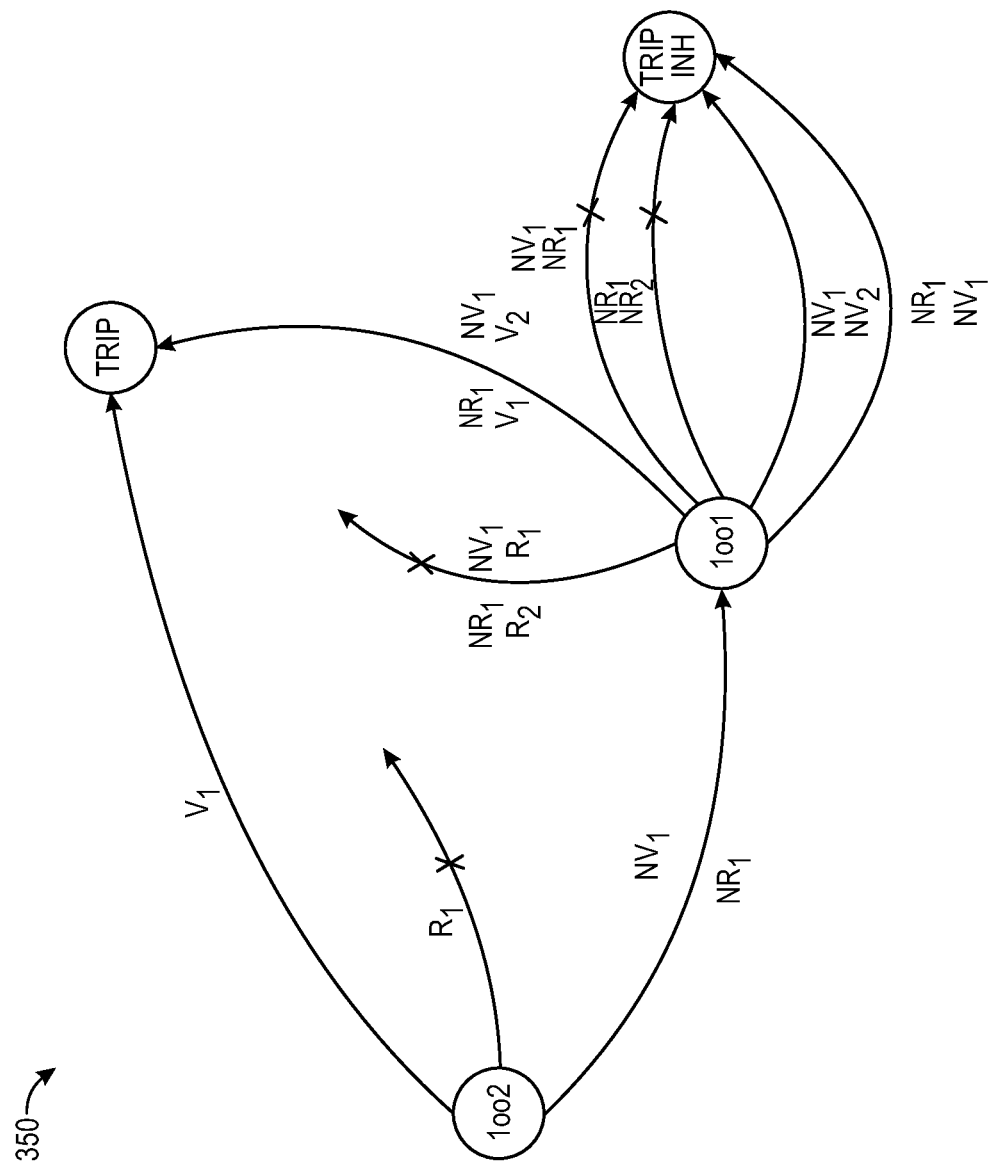

FIGS. 3A-3B depict example state diagrams for various voting schemes of a configurable voting block. In particular, FIG. 3A depicts an example state diagram 305 for a 2oo3 voting scheme with a degradation option, FIG. 3B depicts an example state diagram 325 for a 2oo2 voting scheme with a degradation option, and FIG. 3C depicts an example state diagram 350 for a 1oo2 voting scheme with a degradation option. In particular, the state diagrams 305, 325, 350 illustrate how a voting scheme of a voting block is degraded or modified based on certain control selections. The lines that are crossed-off (i.e., denoted with an "x") represent invalid paths.

FIGS. 4A-4I depict example truth tables for example configurable voting blocks. Each of the truth tables indicates a voting scheme (in each case, 2oo3) and a set of inputs (in each case, Input 1, Input 2, and Input 3). According to embodiments, each of the set of inputs may have one of four values: NORMAL ("NML"), TRIP ("TRP"), BYPASS ("BYP"), or BAD ("BAD").

Additionally, each example truth table indicates a set of control selections that may be specified or selected by a user via a user interface. In an implementation, the set of control selections may be selected via a user interface which may implement a drop-down menu or other selection technique. One of the control selections is a bypass degrade selection that directs whether a BYP input degrades the voting scheme. For example, a 2oo3 voting scheme that is degraded becomes a 1oo3 voting scheme. According to embodiments, an "N" (Normal) selection directs that a BYP input does not degrade the voting scheme and an "R" (Reduce) selection directs that a BYP input does degrade the voting scheme. The bypass degrade selection enables a user to specify an "N" or an "R" for multiple instances of a BYP input. For instance, an "N" may be specified for the first instance of a BYP input and an "R" may be specified for the second instance of a BYP input (or vice-versa). It should be appreciated that other combinations of "N" and "R" are envisioned.

Similarly, another of the control selections is a status degrade selection that directs whether a BAD input degrades the voting scheme. According to embodiments, an "N" (Normal) selection directs that a BAD input does not degrade the voting scheme and a "V" (Vote to Trip) selection directs that a BAD input does degrade the voting scheme. The status degrade selection enables a user to specify an "N" or a "V" for multiple instances of a BAD input. For instance, an "N" may be specified for the first instance of a BAD input and an "V" may be specified for the second instance of a BAD input (or vice-versa). It should be appreciated that other combinations of "N" and "V" are envisioned. The control selections may also support a situation where multiple BAD inputs occur, where each BAD input is treated is a TRP (independent of the status degrade selections).

Further, another of the control selections is a trip inhibit enable selection that directs whether a trip occurs automatically when the number of required votes exceeds the number of votes that are not bypassed or bad. According to embodiments, a "N" (No) selection may direct that a trip does not occur automatically and a "Y" (Yes) selection may direct that a trip does occur automatically. For example, in a given voting scheme AooB, a trip would occur automatically when the number of required votes (A) exceeds the number of votes that are not bypassed or bad (B) (i.e., A>B).

Each truth table indicates a set of columns with values or statuses that are dependent on the voting scheme, the set of inputs, and the control selections. In particular, each truth table includes a "Num Votes" column indicating a number of votes (i.e., the amount of TRP inputs received), and a "Degraded Scheme" column indicating an updated or revised voting scheme (in some cases, degraded voting scheme) based on the inputs and the control selections. Additionally, each truth table includes an "Output" column that indicates the outputs of the configurable voting block based on the respective inputs and the control selections. Moreover, each truth table includes a "Bypass Status" column indicating whether a bypass would be allowed.

Generally, in each truth table, the second number in the revised voting scheme of the "Degraded Scheme" column (e.g., the "3" in 2oo3) represents the number of BYP or BAD inputs subtracted from 3. For example, if the second number is "2," then the number of BYP or BAD inputs is one; if the second number is "1", then the number of BYP or BAD inputs is two, and so on. The second number, then, represents the number of GOOD non-bypassed inputs in an effective voting scheme.

In a truth table 400 as depicted in FIG. 4A, the bypass degrade selections are "N" (402) and "R" (404) (i.e., the first instance of a BYP input does not degrade the voting scheme and a second instance of a BYP input does degrade the voting scheme), the status degrade selections are "V" (406) and "N" (408) (i.e., the first instance of a BAD input does degrade the voting scheme and a second instance of a BAD input does not degrade the voting scheme), and the trip inhibit enable selection is "N" (410) (i.e., a trip does not automatically occur when the number of required votes exceeds the number of votes that are not bypassed or bad).

As shown in FIG. 4A, a row 411 includes a set of inputs NML, NML, and TRP, resulting in the "Num Votes" being "1", an updated voting scheme (2oo3), an output of NML (because two out of the three inputs are NML), and a bypass being allowed; a row 412 includes a set of inputs NML, TRP, and TRP, resulting in the "Num Votes" being "2", an updated voting scheme (2oo3), an output of TRP (because two out of the three inputs are TRP), and a bypass being allowed; a row 413 includes a set of inputs BYP, NML, and NML, resulting in the "Num Votes" being "0", an updated voting scheme of 2oo2 (the first BYP input does not degrade the voting scheme), an output of NML (because two out of the three inputs are NML), and a bypass being allowed (because a second BYP input is configured to reduce the votes to trip so a second bypass would go to a 1oo1 scheme); and a row 414 includes a set of inputs BYP, BYP, and NML, resulting in the "Num Votes" being "0", an updated voting scheme of 1oo1 (because the second BYP input degrades the voting scheme), an output of NML (because the first BYP is treated as a NML input), and a bypass not being allowed. The remaining rows of the truth table 400 cause the configurable voting block to operate similarly.

FIG. 4B depicts an additional example truth table 420 with a 2oo3 voting scheme and the following set of control selections 421: N, N, N, N, and N. A representative row 422 of the truth table 420 includes a set of inputs BYP, NML, and NML, resulting in the "Num Votes" being "0", an updated voting scheme of 2oo2 (the first BYP input does not degrade the voting scheme), an output of NML (because two out of the three inputs are NML), and a bypass not being allowed (because a second BYP input is configured to not reduce the votes to trip so a second bypass cannot happen as it is configured to not reduce the 2 to a 1, thus the bypass is not allowed as a disallowed state would be entered). Another representative row 423 of the truth table 420 includes a set of inputs BAD, TRP, and NML, resulting in the "Num Votes" being "1", an updated voting scheme of 2oo2 (the BAD input does not degrade the voting scheme), an output of NML (because the BAD input is treated as NML), and a bypass not being allowed.

FIG. 4C depicts an additional example truth table 425 with a 2oo3 voting scheme and the following set of control selections 426: R, N, N, N, and N. A representative row 427 of the truth table 425 includes a set of inputs BYP, TRP, and NML, resulting in the "Num Votes" being "1", an updated voting scheme of 1oo2 (the first BYP input does degrade the voting scheme), an output of TRP (because the BYP input is treated as TRP), and a bypass being allowed. Another representative row 428 of the truth table 425 includes a set of inputs BAD, TRP, and NML, resulting in the "Num Votes" being "1", an updated voting scheme of 2oo2 (the BAD input does not degrade the voting scheme), an output of NML (because the BAD input is treated as NML), and a bypass not being allowed.

FIG. 4D depicts an additional example truth table 430 with a 2oo3 voting scheme and the following set of control selections 431: N, R, N, N, and N. A representative row 432 of the truth table 430 includes a set of inputs BYP, TRP, and NML, resulting in the "Num Votes" being "1", an updated voting scheme of 2oo2 (the first BYP input does not degrade the voting scheme), an output of NML (because the BYP input is treated as NML), and a bypass being allowed. Another representative row 433 of the truth table 430 includes a set of inputs BAD, NML, and NML, resulting in the "Num Votes" being "0", an updated voting scheme of 2oo2 (the BAD input does not degrade the voting scheme), an output of NML (the BAD input is treated as NML), and a bypass not being allowed.

FIG. 4E depicts an additional example truth table 435 with a 2oo3 voting scheme and the following set of control selections 436: R, R, N, N, and N. A representative row 437 of the truth table 435 includes a set of inputs BYP, TRP, and NML, resulting in the "Num Votes" being "1", an updated voting scheme of 1oo2 (the first BYP input does degrade the voting scheme), an output of TRP (because the BYP input reduces the number of votes required to trip and there is a TRP input that causes the TRP output in the resultant voting scheme of 1oo2), and a bypass not being allowed. Another representative row 438 of the truth table 435 includes a set of inputs BYP, BAD, and NML, resulting in the "Num Votes" being "0", an updated voting scheme of 1oo1 (the BYP input does degrade the voting scheme), an output of NML (because there is one NML input in a 1oo1 voting scheme), and a bypass not being allowed.

FIG. 4F depicts an additional example truth table 440 with a 2oo3 voting scheme and the following set of control selections 441: N, N, V, N, and N. A representative row 442 of the truth table 440 includes a set of inputs BAD, TRP, and NML, resulting in the "Num Votes" being "1", an updated voting scheme of 1oo2 (the BAD input does degrade the voting scheme), an output of TRP (because the BAD input reduces the number of votes required to trip and there is a TRP input that causes the TRP output in the resultant voting scheme of 1oo2), and a bypass being allowed. Another representative row 443 of the truth table 440 includes a set of inputs BAD, BAD, and NML, resulting in the "Num Votes" being "0", an updated voting scheme of 1oo1 (the first BAD input does degrade the voting scheme), an output of NML (because there is one NML input in a 1oo1 voting scheme), and a bypass not being allowed.

FIG. 4G depicts an additional example truth table 445 with a 2oo3 voting scheme and the following set of control selections 446: N, N, N, V, and N. A representative row 447 of the truth table 445 includes a set of inputs BAD, TRP, and NML, resulting in the "Num Votes" being "1", an updated voting scheme of 2oo2 (the first BAD input does not degrade the voting scheme), an output of NML (because the BAD input is ignored and there is only a single TRP input in the 2oo2 voting scheme), and a bypass not being allowed. Another representative row 448 of the truth table 445 includes a set of inputs BYP, BAD, and NML, resulting in the "Num Votes" being "0", an updated effective voting scheme of 2oo1 (the BAD input does not degrade the voting scheme), an output of TRP (because there is one BAD input which is a VOTE to trip), and a bypass not being allowed.

FIG. 4H depicts an additional example truth table 450 with a 2oo3 voting scheme and the following set of control selections 451: N, N, V, V, and N. A representative row 452 of the truth table 450 includes a set of inputs BAD, TRP, and NML, resulting in the "Num Votes" being "1", an updated voting scheme of 1oo2 (the BAD input does degrade the voting scheme), an output of TRP (because the BAD input is treated as TRP), and a bypass being allowed. Another representative row 453 of the truth table 450 includes a set of inputs BAD, BAD, and NML, resulting in the "Num Votes" being "0", an updated voting scheme of 0oo1 (each BAD input does degrade the voting scheme), an output of TRP (because both BAD inputs are treated as a vote), and a bypass being allowed.

FIG. 4I depicts an additional example truth table 455 with a 2oo3 voting scheme and the following set of control selections 456: N, N, N, N, and Y. A representative row 457 of the truth table 455 includes a set of inputs BYP, BYP, and NML, resulting in the "Num Votes" being "0", an updated voting scheme of 2oo1 (the BYP inputs do not degrade the voting scheme), an output of INH (because the trip INH enable is "Y" and 2>1 in the 2oo1 voting scheme), and a bypass not being allowed. Another representative row 458 of the truth table 455 includes a set of inputs BAD, TRP, and TRP, resulting in the "Num Votes" being "2", an updated voting scheme of 2oo2 (the BAD input does not degrade the voting scheme), an output of TRP (because there are two TRP inputs), and a bypass not being allowed.

Figure 5:
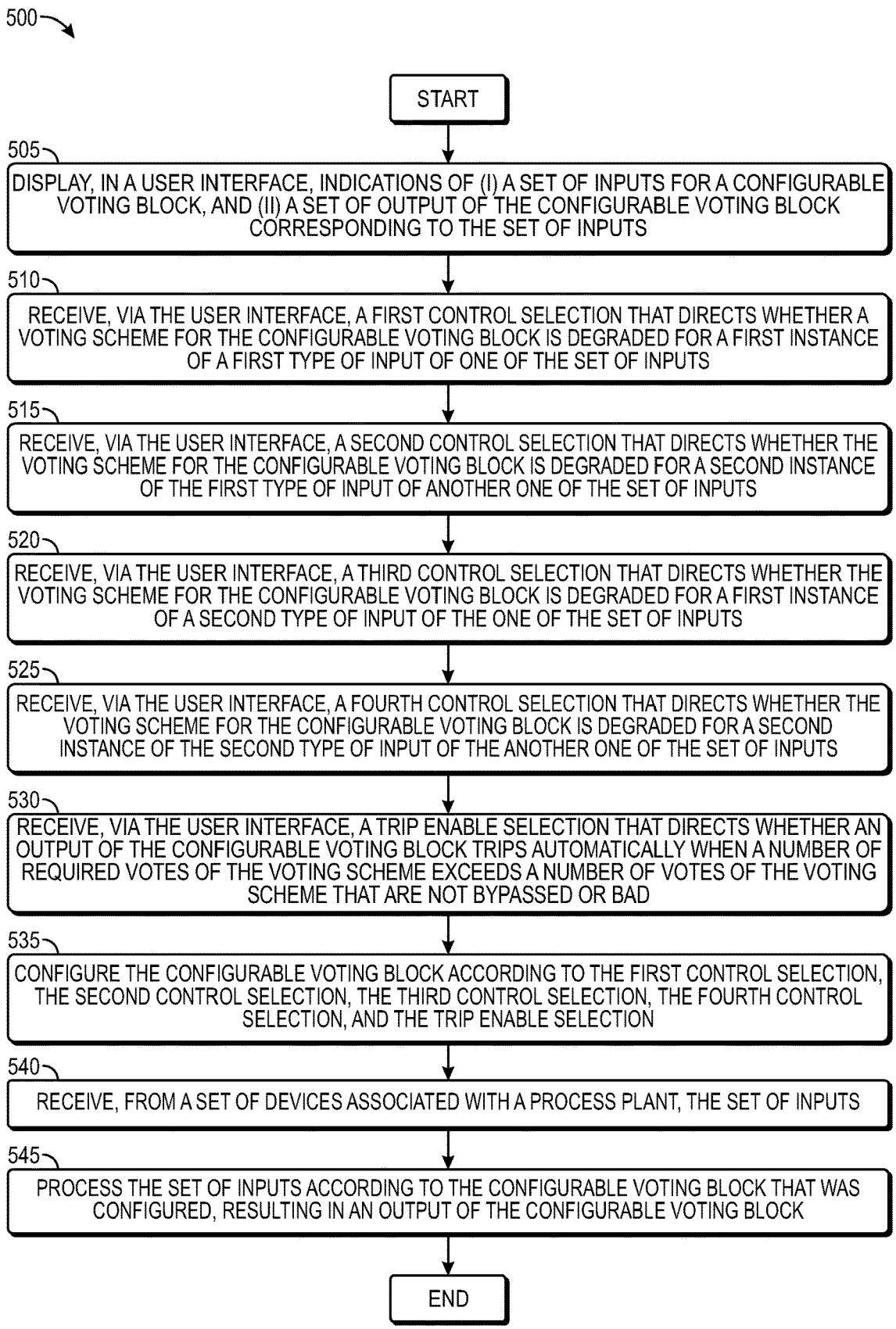
FIG. 5 is a flow diagram of an example method of enabling configuration of a configurable voting block, according to certain embodiments.

FIG. 5 depicts a block diagram of an example method 500 of enabling configuration of a configurable voting block for a process control system in a process plant. According to embodiments, the configurable voting block may have a voting scheme associated with a set of inputs. Further, the method 500 may be facilitated by a computer device (and more specifically, a processor thereof), configured to connect to implement the configurable voting block, and interface with a controller associated with the process control system.

The method 500 may begin when the computer device displays (block 505), in a user interface, indications of (i) a set of inputs for a configurable voting block, and (ii) a set of outputs of the configurable voting block corresponding to the set of indications associated with the set of inputs. According to embodiments, the set of inputs may represent one or more combinations of various inputs, including NML, TRP, BYP, BAD, and/or others, where the set of inputs may be "test" inputs that may enable a user of the computer device to assess the set of inputs in combination with the set of outputs, as illustrated in FIGS. 4A-4I. Further, each output of the set of outputs may correspond to multiple inputs of the set of inputs, and may be based on a set of control selections that may be configurable via the user interface. It should be appreciated that the configurable voting block may be configured with a voting scheme (e.g., 2oo3) that may be default or configured by the computer device or a user thereof.

The computer device may receive (block 510), via the user interface, a first control selection that directs whether the voting scheme for the configurable voting block is degraded for a first instance of a first type of input of one of the set of inputs. Further, the computer device may receive (block 515), via the user interface, a second control selection that directs whether the voting scheme for the configurable voting block is degraded for a second instance of the first type of input of another one of the set of inputs. Additionally, the computer device may receive (block 520), via the user interface, a third control selection that directs whether the voting scheme for the configurable voting block is degraded for a first instance of a second type of input of the one of the set of inputs. Moreover, the computer device may receive (block 525), via the user interface, a fourth control selection that directs whether the voting scheme for the configurable voting block is degraded for a second instance of the second type of input of the another one of the set of inputs.

According to embodiments, the first type of input may be a BYP input (in which case the first and second control selections correspond to bypass degrade selections directing whether the voting scheme for the configurable voting block is degraded) and the second type of input may be a BAD input (in which case the first and second control selections correspond to status degrade selections directing whether the voting scheme for the configurable voting block is degraded), or the first type of input may be a BAD input and the second type of input may be a BYP input.

In an implementation, the computer device may receive (block 530), via the user interface, a trip enable selection that directs whether an output of the configurable voting block trips automatically when a number of required votes of the voting scheme exceeds a number of votes of the voting scheme that are not bypassed or bad (i.e., A>B for a AooB voting scheme).

The computer device may configure (block 535) the configurable voting block according to the first control selection, the second control selection, the third control selection, the fourth control selection, and the trip enable selection. Further, the computer device may receive (block 540), from a set of devices associated with the process plant, the set of inputs. In particular, the computer device may initially receive, from a first device of the set of devices, the first instance of the first type of input (or the second type of input) of the one of the set of inputs, and subsequently receive, from a second device of the set of devices, the second instance of the first type of input (or the second type of input) of the another one of the set of inputs.

The computer device may process (block 545) the set of inputs according to the configurable voting block that was configured in block 535, resulting in the output(s) of the configurable voting block. In embodiments, after processing the set of inputs, the computer device may display, in the user interface, a set of updates to the set of outputs according to the configurable voting block that was configured.

Embodiments of the techniques described in the present disclosure may include any number of the following aspects, either alone or combination:

1. A computer-implemented method of enabling configuration of a configurable voting block for a process control system in a process plant, the configurable voting block having a voting scheme associated with a set of inputs, the method comprising: receiving, via a user interface, a first control selection that directs whether the voting scheme for the configurable voting block is degraded for a first instance of a first type of input of one of the set of inputs; receiving, via the user interface, a second control selection that directs whether the voting scheme for the configurable voting block is degraded for a second instance of the first type of input of another one of the set of inputs; configuring the configurable voting block according to the first control selection and the second control selection; receiving, from a set of devices associated with the process plant, the set of inputs; and processing the set of inputs according to the configurable voting block that was configured, wherein the processing results in an output of the configurable voting block.

2. The computer-implemented method of claim 1, wherein the first control selection directs that the voting scheme for the configurable voting block is degraded, and wherein the second control selection directs that the voting scheme for the configurable voting block is not degraded.

3. The computer-implemented method of claim 1, wherein the first control selection directs that the voting scheme for the configurable voting block is not degraded, and wherein the second control selection directs that the voting scheme for the configurable voting block is degraded.

4. The computer-implemented method of any of claims 1 to 3, wherein the first type of input is a bypass (BYP) input or a bad (BAD) input.

5. The computer-implemented method of any of claims 1 to 4, further comprising: receiving, via the user interface, a third control selection that directs whether the voting scheme for the configurable voting block is degraded for a first instance of a second type of input of the one of the set of inputs; and receiving, via the user interface, a fourth control selection that directs whether the voting scheme for the configurable voting block is degraded for a second instance of the second type of input of the another one of the set of inputs.

6. The computer-implemented method of any of claims 1 to 5, wherein receiving the set of inputs comprises: receiving, from a first device of the set of devices, the first instance of the first type of input of the one of the set of inputs; and subsequently receiving, from a second device of the set of devices, the second instance of the first type of input of the another one of the set of inputs.

7. The computer-implemented method of any one of claims 1 to 6, further comprising: receiving, via the user interface, a trip enable selection that directs whether the output of the configurable voting block trips automatically when a number of required votes of the voting scheme exceeds a number of votes of the voting scheme that are not bypassed or bad.

8. The computer-implemented method of any one of claims 1 to 7, further comprising: displaying, in the user interface, indications of (i) the set of inputs for the configurable voting block, and (ii) a set of outputs of the configurable voting block corresponding to the set of inputs; and after processing the set of inputs according to the configurable voting block that was configured, displaying, in the user interface, a set of updates to the set of outputs according to the configurable voting block that was configured.

9. The computer-implemented method of any one of claims 1 to 8, wherein the voting scheme is two out of three (2oo3).

10. A computing device for enabling configuration of a configurable voting block for a process control system in a process plant, the configurable voting block having a voting scheme associated with a set of inputs, comprising: a user interface; a memory storing a set of computer-executable instructions; and a processor interfacing with the user interface and the memory, and configured to execute the set of computer-executable instructions to cause the processor to: receive, via the user interface, a first control selection that directs whether the voting scheme for the configurable voting block is degraded for a first instance of a first type of input of one of the set of inputs, receive, via the user interface, a second control selection that directs whether the voting scheme for the configurable voting block is degraded for a second instance of the first type of input of another one of the set of inputs, configure the configurable voting block according to the first control selection and the second control selection, receive, from a set of devices associated with the process plant, the set of inputs, and process the set of inputs according to the configurable voting block that was configured, wherein the processing results in an output of the configurable voting block.

11. The computing device of claim 10, wherein the first control selection directs that the voting scheme for the configurable voting block is degraded, and wherein the second control selection directs that the voting scheme for the configurable voting block is not degraded.

12. The computing device of claim 10, wherein the first control selection directs that the voting scheme for the configurable voting block is not degraded, and wherein the second control selection directs that the voting scheme for the configurable voting block is degraded.

13. The computing device of any one of claims 10 to 12, wherein the first type of input is a bypass (BYP) input or a bad (BAD) input.

14. The computing device of any one of claims 10 to 13, wherein the processor is further configured to: receive, via the user interface, a third control selection that directs whether the voting scheme for the configurable voting block is degraded for a first instance of a second type of input of the one of the set of inputs, and receive, via the user interface, a fourth control selection that directs whether the voting scheme for the configurable voting block is degraded for a second instance of the second type of input of the another one of the set of inputs.

15. The computing device of any one of claims 10 to 14, wherein to receive the set of inputs, the processor is configured to: receive, from a first device of the set of devices, the first instance of the first type of input of the one of the set of inputs, and subsequently receive, from a second device of the set of devices, the second instance of the first type of input of the another one of the set of inputs.

16. The computing device of any one of claims 10 to 15, wherein the processor is further configured to: receive, via the user interface, a trip enable selection that directs whether the output of the configurable voting block trips automatically when a number of required votes of the voting scheme exceeds a number of votes of the voting scheme that are not bypassed or bad.

17. The computing device of any one of claims 10 to 16, wherein the processor is further configured to: cause the user interface to display indications of (i) the set of inputs for the configurable voting block, and (ii) a set of outputs of the configurable voting block corresponding to the set of inputs, and after processing the set of inputs according to the configurable voting block that was configured, cause the user interface to display a set of updates to the set of outputs according to the configurable voting block that was configured.

18. The computing device of any one of claims 10 to 17, wherein the voting scheme is two out of three (2oo3).

19. A controller module for use in a process plant having a processor communicatively coupled to control one or more field devices, comprising: a non-transitory computer readable medium; and a function block stored on the non-transitory computer readable medium and executed on the processor, the function block comprising: a set of inputs, each configured to receive an input signal from within the process plant indicating a process condition, a first control block comprising a first control parameter that directs whether a voting scheme for the function block is degraded for a first instance of a first type of input of one of the set of inputs, a second control block comprising a second control parameter that directs whether the voting scheme for the function block is degraded for a second instance of the first type of input of another one of the set of inputs, an output providing an output signal, and a voter logic block coupled between the first control block, the second control block, and the output, the voter logic block configured to produce the output signal based on the set of input signals, the first control parameter, and the second control parameter.

20. The controller module of claim 19, wherein the first control parameter directs that the voting scheme for the function block is degraded, and wherein the second control parameter directs that the voting scheme for the function block is not degraded.

21. The controller module of claim 19, wherein the first control parameter directs that the voting scheme for the function block is not degraded, and wherein the second control parameter directs that the voting scheme for the function block is degraded.

22. The controller module of any one of claims 19 to 21, wherein the first type of input is a bypass (BYP) input or a bad (BAD) input.

23. The controller module of any one of claims 19 to 22, wherein the function block further comprises: a third control block comprising a third control parameter that directs whether the voting scheme for the function block is degraded for a first instance of a second type of input of the one of the set of inputs, and a fourth control block comprising a fourth control parameter that directs whether the voting scheme for the function block is degraded for a second instance of the second type of input of the another one of the set of inputs.

24. The controller module of any one of claims 19 to 23, wherein the function block further comprises: a fifth control block comprising a trip enable parameter that directs whether the output signal of the function block trips automatically when a number of required votes of the voting scheme exceeds a number of votes of the voting scheme that are not bypassed or bad.

25. The controller module of any one of claims 19 to 24, wherein the voting scheme is two out of three (2oo3).

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a commissioning tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method of enabling configuration of a configurable voting block for a process control system in a process plant, the configurable voting block having a voting scheme associated with a set of inputs generated by a set of field devices to control operation of at least one device within the process plant, the method comprising:
   receiving, via a user interface, a first control selection that directs whether the voting scheme for the configurable voting block is degraded for a first instance of a first type of input of one of the set of inputs;
   receiving, via the user interface, a second control selection that directs whether the voting scheme for the configurable voting block is degraded for a second instance of the first type of input of another one of the set of inputs;
   receiving, via the user interface, a trip inhibit enable selection that directs whether the at least one device is inhibited from tripping automatically when a number of required votes of the voting scheme exceeds a number of votes of the voting scheme that are not bypassed or bad, wherein the trip inhibit enable selection is either a yes selection or a no selection;
   configuring the configurable voting block according to the first control selection, the second control selection, and the trip inhibit enable selection;
   receiving, from the set of field devices, the set of inputs; and
   determining, from the set of inputs and according to the configurable voting block that was configured, whether the number of required votes of the voting scheme exceeds the number of votes of the voting scheme that are not bypassed or bad; and
   based on the determining, causing the at least one device to trip automatically or be inhibited from tripping automatically.

2. The computer-implemented method of claim 1, wherein the first control selection directs that the voting scheme for the configurable voting block is degraded, and wherein the second control selection directs that the voting scheme for the configurable voting block is not degraded.

3. The computer-implemented method of claim 1, wherein the first control selection directs that the voting scheme for the configurable voting block is not degraded, and wherein the second control selection directs that the voting scheme for the configurable voting block is degraded.

4. The computer-implemented method of claim 1, wherein the first type of input is a bypass (BYP) input or a bad (BAD) input.

5. The computer-implemented method of claim 1, further comprising:
   receiving, via the user interface, a third control selection that directs whether the voting scheme for the configurable voting block is degraded for a first instance of a second type of input of the one of the set of inputs; and
   receiving, via the user interface, a fourth control selection that directs whether the voting scheme for the configurable voting block is degraded for a second instance of the second type of input of the another one of the set of inputs.

6. The computer-implemented method of claim 1, wherein receiving the set of inputs comprises:
   receiving, from a first field device of the set of field devices, the first instance of the first type of input of the one of the set of inputs; and
   subsequently receiving, from a second field device of the set of field devices, the second instance of the first type of input of the another one of the set of inputs.

7. The computer-implemented method of claim 1, wherein the voting scheme is two out of three (2oo3).

8. A computing device for enabling configuration of a configurable voting block for a process control system in a process plant, the configurable voting block having a voting scheme associated with a set of inputs generated by a set of field devices to control operation of at least one device within the process plant, comprising:
   a user interface;
   a memory storing a set of computer-executable instructions; and
   a processor interfacing with the user interface and the memory, and configured to execute the set of computer-executable instructions to cause the processor to:
      receive, via the user interface, a first control selection that directs whether the voting scheme for the configurable voting block is degraded for a first instance of a first type of input of one of the set of inputs,
      receive, via the user interface, a second control selection that directs whether the voting scheme for the configurable voting block is degraded for a second instance of the first type of input of another one of the set of inputs,
      receive, via the user interface, a trip inhibit enable selection that directs whether the at least one device is inhibited from tripping automatically when a number of required votes of the voting scheme exceeds a number of votes of the voting scheme that are not bypassed or bad, wherein the trip inhibit enable selection is either a yes selection or a no selection,
      configure the configurable voting block according to the first control selection, the second control selection, and the trip inhibit enable selection,
      receive, from the set of field devices, the set of inputs, and
      determine, from the set of inputs and according to the configurable voting block that was configured, whether the number of required votes of the voting scheme exceeds the number of votes of the voting scheme that are not bypassed or bad; and
      based on the determining, cause the at least one device to trip automatically or be inhibited from tripping automatically.

9. The computing device of claim 8, wherein the first control selection directs that the voting scheme for the configurable voting block is degraded, and wherein the second control selection directs that the voting scheme for the configurable voting block is not degraded.

10. The computing device of claim 8, wherein the first control selection directs that the voting scheme for the configurable voting block is not degraded, and wherein the second control selection directs that the voting scheme for the configurable voting block is degraded.

11. The computing device of claim 8, wherein the first type of input is a bypass (BYP) input or a bad (BAD) input.

12. The computing device of claim 8, wherein the processor is further configured to:
   receive, via the user interface, a third control selection that directs whether the voting scheme for the configurable voting block is degraded for a first instance of a second type of input of the one of the set of inputs, and
   receive, via the user interface, a fourth control selection that directs whether the voting scheme for the configurable voting block is degraded for a second instance of the second type of input of the another one of the set of inputs.

13. The computing device of claim 8, wherein to receive the set of inputs, the processor is configured to:
   receive, from a first field device of the set of field devices, the first instance of the first type of input of the one of the set of inputs, and
   subsequently receive, from a second field device of the set of field devices, the second instance of the first type of input of the another one of the set of inputs.

14. The computing device of claim 8, wherein the voting scheme is two out of three (2oo3).

15. A controller module for use in a process plant having a processor communicatively coupled to control at least one device within the process plant based on a set of inputs generated by a set of field devices, comprising:
   a non-transitory computer readable medium; and
   a function block stored on the non-transitory computer readable medium and executed on the processor, the function block comprising:
      a set of inputs, each configured to receive an input signal respectively from the set of field devices, the input signal indicating a process condition,
      a first control block comprising a first control parameter that directs whether a voting scheme for the function block is degraded for a first instance of a first type of input of one of the set of inputs,
      a second control block comprising a second control parameter that directs whether the voting scheme for the function block is degraded for a second instance of the first type of input of another one of the set of inputs,
      a third control block comprising a trip inhibit enable parameter that directs whether the at least one device is inhibited from tripping automatically when a number of required votes of the voting scheme exceeds a number of votes of the voting scheme that are not bypassed or bad, wherein the trip inhibit enable parameter is either a yes selection or a no selection,
      an output providing an output signal, and
      a voter logic block coupled between the first control block, the second control block, the third control block, and the output, the voter logic block configured to:
         determine, from the set of input signals and according to the first control parameter, the second control parameter, and the trip inhibit enable parameter, whether the number of required votes of the voting scheme exceeds the number of votes of the voting scheme that are not bypassed or bad, and based on the determining, produce the output signal;

wherein the processor is configured to, based on the output signal, cause the at least one device to trip automatically or be inhibited from tripping automatically.

16. The controller module of claim 15, wherein the first control parameter directs that the voting scheme for the function block is degraded, and wherein the second control parameter directs that the voting scheme for the function block is not degraded.

17. The controller module of claim 15, wherein the first control parameter directs that the voting scheme for the function block is not degraded, and wherein the second control parameter directs that the voting scheme for the function block is degraded.

18. The controller module of claim 15, wherein the first type of input is a bypass (BYP) input or a bad (BAD) input.

19. The controller module of claim 15, wherein the function block further comprises:
   a fourth control block comprising a third control parameter that directs whether the voting scheme for the function block is degraded for a first instance of a second type of input of the one of the set of inputs, and
   a fifth control block comprising a fourth control parameter that directs whether the voting scheme for the function block is degraded for a second instance of the second type of input of the another one of the set of inputs.

20. The controller module of claim 15, wherein the voting scheme is two out of three (2oo3).

\* \* \* \* \*

UNITED STATES PATENT AND TRADEMARK OFFICE
CERTIFICATE OF CORRECTION

| | | |
|---|---|---|
| PATENT NO. | : 11,656,594 B2 | Page 1 of 1 |
| APPLICATION NO. | : 16/660439 | |
| DATED | : May 23, 2023 | |
| INVENTOR(S) | : Gary K. Law et al. | |

It is certified that error appears in the above-identified patent and that said Letters Patent is hereby corrected as shown below:

In the Specification

At Column 3, Line 46, "devices" should be -- devices. --.

At Column 4, Line 49, "is" should be -- is a --.

At Column 9, Lines 38-39, "logic solvers logic solvers" should be -- logic solvers --.

At Column 12, Line 28, "N2" should be -- IN2 --.

At Column 13, Line 11, "that" should be -- so that --.

At Column 15, Line 3, "2002" should be -- 2oo2 --.

At Column 15, Line 50, "treated is" should be -- treated as --.

Signed and Sealed this
Twentieth Day of January, 2026

John A. Squires
*Director of the United States Patent and Trademark Office*